US011961147B1

(12) United States Patent
Cupp et al.

(10) Patent No.: US 11,961,147 B1
(45) Date of Patent: Apr. 16, 2024

(54) CARDS, DEVICES, SYSTEMS, AND METHODS FOR FINANCIAL MANAGEMENT SERVICES

(71) Applicants: K. Shane Cupp, New Kensington, PA (US); Matthew E. Davin, Bethel Park, PA (US)

(72) Inventors: K. Shane Cupp, New Kensington, PA (US); Matthew E. Davin, Bethel Park, PA (US)

(*) Notice: Subject to any disclaimer, the term of this patent is extended or adjusted under 35 U.S.C. 154(b) by 0 days.

(21) Appl. No.: 13/862,295

(22) Filed: Apr. 12, 2013

Related U.S. Application Data

(60) Provisional application No. 61/624,377, filed on Apr. 15, 2012.

(51) Int. Cl.
*G06Q 40/00* (2012.01)
*G06Q 40/10* (2023.01)
(52) U.S. Cl.
CPC .................................. *G06Q 40/10* (2013.01)
(58) Field of Classification Search
CPC ........ G06Q 40/10; G06Q 40/02; G06Q 40/00; G06Q 40/04; G06Q 40/06; G06Q 40/12; G06Q 20/10; G06Q 10/06; G06Q 30/08; A63F 13/12; A63F 13/33; A63F 13/332; A63F 13/335
USPC ......... 705/16, 28–30, 35, 32, 34, 39, 41, 44; 235/375, 376, 379; 236/379; 463/42; 707/10, 100, 104; 370/322, 329
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Andrew Joseph Rudy
(74) *Attorney, Agent, or Firm* — Morris Law Group; Robert W. Morris

(57) ABSTRACT

A user is provided with a GUI that may allow the user to change functionality associated with a non-battery-powered card, a battery-powered card, a payment sticker, or another device (e.g., a mobile telephonic device). Such functionality may cause a network entity to deliver transaction details to a processing facility. The processing facility may scrub personal information from the transaction details and provide sanitized information to third party applications that may utilize the sanitized information for value. An accounting programming language interface is provided to provide control input to a financial management system to provide accounting operations to track financial transactions initiated by third party applications.

13 Claims, 11 Drawing Sheets

(56) References Cited

U.S. PATENT DOCUMENTS

| | | | |
|---|---|---|---|
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,465,206 A * | 11/1995 | Hilt | G06Q 20/04 705/40 |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,638,374 A * | 6/1997 | Heath | H04B 7/18589 370/348 |
| 5,655,102 A * | 8/1997 | Galles | G06F 13/1631 711/146 |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,202,055 B1 * | 3/2001 | Houvener | G06Q 20/04 705/44 |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,397,194 B1 * | 5/2002 | Houvener | G06Q 20/04 705/16 |
| 6,411,715 B1 | 6/2002 | Liskov et al. | |
| 6,422,462 B1 * | 7/2002 | Cohen | G07F 7/025 705/41 |
| 6,446,052 B1 | 9/2002 | Juels | |
| 6,460,141 B1 | 10/2002 | Olden | |
| 6,549,912 B1 * | 4/2003 | Chen | G06Q 20/105 |
| 6,592,044 B1 | 7/2003 | Wong et al. | |
| 6,607,127 B2 | 8/2003 | Wong | |
| 6,609,654 B1 | 8/2003 | Anderson et al. | |
| 6,625,598 B1 * | 9/2003 | Krafft | G06F 17/2211 703/16 |
| 6,631,849 B2 | 10/2003 | Blossom | |
| 6,655,585 B2 | 12/2003 | Shinn | |
| 6,681,988 B2 | 1/2004 | Stack et al. | |
| 6,704,714 B1 * | 3/2004 | O'Leary | G06Q 20/04 705/39 |
| 6,705,520 B1 | 3/2004 | Pitroda et al. | |
| 6,721,763 B1 * | 4/2004 | Pekowski | G06Q 30/02 707/804 |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,902,116 B2 | 6/2005 | Finkelstein | |
| 6,968,319 B1 * | 11/2005 | Remington | G06Q 20/04 705/34 |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,050,997 B1 * | 5/2006 | Wood, Jr. | G06Q 40/06 705/36 R |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,430,537 B2 * | 9/2008 | Templeton | G06Q 20/102 705/39 |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,478,062 B2 * | 1/2009 | Ansley | G06Q 40/00 705/35 |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,505,937 B2 * | 3/2009 | Dilip | G06Q 20/10 705/35 |
| 7,505,938 B2 * | 3/2009 | Lang | G06Q 30/06 370/229 |
| 7,516,492 B1 | 4/2009 | Nisbet et al. | |
| 7,523,301 B2 | 4/2009 | Nisbet et al. | |
| 7,526,576 B2 * | 4/2009 | Bank | G06F 17/30581 707/999.202 |

(56) References Cited

U.S. PATENT DOCUMENTS

| | | | |
|---|---|---|---|
| 7,530,495 B2 | 5/2009 | Cooper | |
| 7,532,104 B2 | 5/2009 | Juels | |
| 7,543,739 B2 | 6/2009 | Brown et al. | |
| 7,546,274 B2* | 6/2009 | Ingram | G06Q 20/1085 705/42 |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,575,154 B2* | 8/2009 | Rothschild | G06Q 20/24 235/379 |
| 7,577,687 B2* | 8/2009 | Bank | G06F 17/30581 |
| 7,580,898 B2 | 8/2009 | Brown et al. | |
| 7,580,970 B2* | 8/2009 | Bank | G06F 17/30581 707/999.104 |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,611,049 B2* | 11/2009 | Drummond | G06K 7/0004 235/376 |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,707,177 B2* | 4/2010 | Bank | G06F 17/30581 707/617 |
| 7,708,190 B2* | 5/2010 | Brandt | G06Q 20/40 235/379 |
| 7,742,984 B2* | 6/2010 | Mohsenzadeh | G06Q 20/00 705/35 |
| 7,784,687 B2 | 8/2010 | Mullen et al. | |
| 7,793,851 B2 | 9/2010 | Mullen | |
| 7,797,207 B1* | 9/2010 | Dilip | G06Q 20/10 705/35 |
| 7,805,376 B2* | 9/2010 | Smith | G06Q 20/04 235/379 |
| 7,819,321 B2* | 10/2010 | Faith | G06Q 20/367 235/380 |
| 7,828,207 B2 | 11/2010 | Cooper | |
| 7,828,220 B2 | 11/2010 | Mullen | |
| 7,831,636 B2* | 11/2010 | Wietlisbach | G06F 9/44505 707/803 |
| 7,890,423 B2* | 2/2011 | Czyzewski | G06Q 20/102 705/14.17 |
| 7,896,242 B2* | 3/2011 | Rothschild | G06Q 20/20 235/383 |
| 7,931,195 B2 | 4/2011 | Mullen | |
| 7,954,705 B2 | 6/2011 | Mullen | |
| 7,967,214 B2* | 6/2011 | Landau | G06K 19/0702 235/487 |
| D643,063 S | 8/2011 | Mullen et al. | |
| 8,011,577 B2 | 9/2011 | Mullen et al. | |
| 8,020,775 B2 | 9/2011 | Mullen et al. | |
| 8,046,256 B2* | 10/2011 | Chien | G06Q 20/04 705/14.33 |
| 8,066,191 B1 | 11/2011 | Cloutier et al. | |
| D651,237 S | 12/2011 | Mullen et al. | |
| D651,238 S | 12/2011 | Mullen et al. | |
| 8,074,877 B2 | 12/2011 | Mullen et al. | |
| 8,083,141 B1* | 12/2011 | Courtright | G06Q 20/1085 235/380 |
| D651,644 S | 1/2012 | Mullen et al. | |
| D652,075 S | 1/2012 | Mullen et al. | |
| D652,076 S | 1/2012 | Mullen et al. | |
| D652,448 S | 1/2012 | Mullen et al. | |
| D652,449 S | 1/2012 | Mullen et al. | |
| D652,450 S | 1/2012 | Mullen et al. | |
| D652,867 S | 1/2012 | Mullen et al. | |
| D653,288 S | 1/2012 | Mullen et al. | |
| 8,095,440 B2* | 1/2012 | Barry | G06Q 20/382 705/52 |
| 8,116,453 B2* | 2/2012 | Shnowske | A63F 13/71 380/251 |
| 8,172,148 B1 | 5/2012 | Cloutier et al. | |
| 8,185,404 B1* | 5/2012 | McDaniel | G07D 11/34 705/1.1 |
| D665,022 S | 8/2012 | Mullen et al. | |
| D665,447 S | 8/2012 | Mullen et al. | |
| D666,241 S | 8/2012 | Mullen et al. | |
| 8,275,312 B2* | 9/2012 | Fisher | G06Q 20/425 340/5.4 |
| 8,282,007 B1 | 10/2012 | Cloutier et al. | |
| 8,286,876 B2 | 10/2012 | Mullen et al. | |
| D670,329 S | 11/2012 | Mullen et al. | |
| D670,330 S | 11/2012 | Mullen et al. | |
| D670,331 S | 11/2012 | Mullen et al. | |
| D670,332 S | 11/2012 | Mullen et al. | |
| D670,759 S | 11/2012 | Mullen et al. | |
| 8,302,872 B2 | 11/2012 | Mullen | |
| 8,317,752 B2* | 11/2012 | Cozmi | G16H 20/17 604/151 |
| D672,389 S | 12/2012 | Mullen et al. | |
| 8,322,623 B1 | 12/2012 | Mullen et al. | |
| D674,013 S | 1/2013 | Mullen et al. | |
| 8,346,659 B1* | 1/2013 | Mohsenzadeh | G06Q 20/00 705/39 |
| 8,348,172 B1 | 1/2013 | Cloutier et al. | |
| 8,365,148 B2* | 1/2013 | Millmore | G06F 8/20 717/124 |
| D676,904 S | 2/2013 | Mullen et al. | |
| 8,382,000 B2 | 2/2013 | Mullen et al. | |
| 8,393,545 B1 | 3/2013 | Mullen et al. | |
| 8,393,546 B1 | 3/2013 | Yen et al. | |
| 8,413,892 B2 | 4/2013 | Mullen et al. | |
| 8,424,773 B2 | 4/2013 | Mullen et al. | |
| 8,433,657 B2* | 4/2013 | Dinan | G06Q 20/32 705/64 |
| 8,459,548 B2 | 6/2013 | Mullen et al. | |
| D687,094 S | 7/2013 | Mullen et al. | |
| 8,479,220 B2* | 7/2013 | Wilkins | G06F 9/466 719/318 |
| 8,485,437 B2 | 7/2013 | Mullen et al. | |
| 8,485,446 B1 | 7/2013 | Mullen et al. | |
| 8,511,574 B1 | 8/2013 | Yen et al. | |
| 8,517,276 B2 | 8/2013 | Mullen et al. | |
| 8,523,059 B1 | 9/2013 | Mullen et al. | |
| 8,561,894 B1 | 10/2013 | Mullen et al. | |
| 8,567,679 B1 | 10/2013 | Mullen et al. | |
| 8,573,503 B1 | 11/2013 | Cloutier et al. | |
| 8,577,804 B1* | 11/2013 | Bacastow | G06Q 20/102 705/44 |
| 8,579,203 B1 | 11/2013 | Lambeth et al. | |
| 8,590,796 B1 | 11/2013 | Cloutier et al. | |
| 8,595,064 B1* | 11/2013 | Hagy | G06Q 30/02 705/14.1 |
| 8,602,312 B2 | 12/2013 | Cloutier et al. | |
| 8,606,712 B2* | 12/2013 | Choudhuri | G06Q 30/018 705/30 |
| 8,608,083 B2 | 12/2013 | Mullen et al. | |
| 8,622,289 B2* | 1/2014 | Outwater | G06Q 20/24 235/375 |
| 8,622,309 B1 | 1/2014 | Mullen et al. | |
| 8,626,705 B2* | 1/2014 | Barrett | G06Q 30/02 707/603 |
| 8,628,022 B1 | 1/2014 | Rhoades et al. | |
| 8,660,926 B1* | 2/2014 | Wehunt | G06Q 10/00 705/35 |
| 8,668,143 B2 | 3/2014 | Mullen et al. | |
| 8,676,659 B1* | 3/2014 | Shnowske | G06Q 30/00 463/25 |
| 8,676,708 B1* | 3/2014 | Honey | G06Q 40/02 705/44 |
| 8,700,527 B2* | 4/2014 | Dolphin | G06Q 20/10 705/35 |
| 8,706,699 B2* | 4/2014 | Chase | G06F 30/30 707/703 |
| 8,727,219 B1 | 5/2014 | Mullen | |
| 8,733,638 B2 | 5/2014 | Mullen et al. | |
| 8,738,451 B2* | 5/2014 | Ahlers | G06Q 20/10 705/17 |
| 8,746,579 B1 | 6/2014 | Cloutier et al. | |

(56) References Cited

U.S. PATENT DOCUMENTS

| | | | |
|---|---|---|---|
| 8,756,162 B2* | 6/2014 | Brunet | G06Q 20/00 |
| | | | 705/24 |
| 8,757,483 B1 | 6/2014 | Mullen et al. | |
| 8,757,499 B2 | 6/2014 | Cloutier et al. | |
| 8,788,382 B2* | 7/2014 | Monk | G06Q 20/10 |
| | | | 705/35 |
| 8,814,050 B1 | 8/2014 | Mullen et al. | |
| 8,827,153 B1 | 9/2014 | Rhoades et al. | |
| 8,875,999 B2 | 11/2014 | Mullen et al. | |
| 8,881,989 B2 | 11/2014 | Mullen et al. | |
| 8,888,009 B1 | 11/2014 | Mullen | |
| 8,903,093 B2* | 12/2014 | Kim | H04W 12/02 |
| | | | 380/270 |
| 8,903,740 B2* | 12/2014 | Vonog | G06Q 40/02 |
| | | | 705/35 |
| 8,930,265 B2* | 1/2015 | Blackhurst | G06Q 30/0255 |
| | | | 705/35 |
| 8,931,703 B1 | 1/2015 | Mullen et al. | |
| 8,935,186 B2* | 1/2015 | Dinan | G06Q 20/32 |
| | | | 705/65 |
| 8,939,357 B1* | 1/2015 | Perry | G06Q 20/387 |
| | | | 235/379 |
| 8,943,557 B2* | 1/2015 | Kelley | H04L 29/08657 |
| | | | 380/258 |
| 8,944,333 B1 | 2/2015 | Mullen et al. | |
| 8,960,545 B1 | 2/2015 | Batra | |
| 8,972,224 B2* | 3/2015 | Dempster | G06F 17/11 |
| | | | 703/2 |
| 8,973,824 B2 | 3/2015 | Mullen et al. | |
| 9,004,368 B2 | 4/2015 | Mullen et al. | |
| 9,010,630 B2 | 4/2015 | Mullen et al. | |
| 9,053,398 B1 | 6/2015 | Cloutier | |
| 9,064,194 B1* | 6/2015 | Bohac, Jr. | G06K 19/07345 |
| 9,064,255 B1 | 6/2015 | Mullen et al. | |
| 9,071,543 B2* | 6/2015 | Plamondon | H04L 1/1887 |
| 9,106,414 B2* | 8/2015 | Laves | H04H 20/16 |
| 9,165,292 B2* | 10/2015 | Aguilar | G06Q 20/16 |
| 9,165,295 B2* | 10/2015 | Kim | G06Q 20/3278 |
| 9,224,144 B2* | 12/2015 | Smith | G06Q 20/1085 |
| 9,245,410 B2* | 1/2016 | Anderson | G07F 17/3244 |
| 9,292,843 B1 | 3/2016 | Mullen et al. | |
| 9,299,227 B2* | 3/2016 | Billett | G07F 19/20 |
| 9,306,666 B1 | 4/2016 | Zhang et al. | |
| 9,329,619 B1 | 5/2016 | Cloutier | |
| 9,349,089 B1 | 5/2016 | Rhoades et al. | |
| 9,361,569 B2 | 6/2016 | Mullen et al. | |
| 9,373,069 B2 | 6/2016 | Cloutier et al. | |
| 9,373,119 B2* | 6/2016 | Salesky | G06Q 20/10 |
| 9,384,438 B2 | 7/2016 | Mullen et al. | |
| 9,396,470 B2* | 7/2016 | Gannon | G06Q 20/20 |
| 9,405,984 B2* | 8/2016 | Irwin, Jr. | G06K 9/18 |
| 9,496,991 B2* | 11/2016 | Plamondon | H04L 1/1887 |
| 9,507,667 B1* | 11/2016 | Scott | G06F 11/1435 |
| 9,542,675 B2* | 1/2017 | Hammad | G06Q 20/325 |
| 9,547,816 B2 | 1/2017 | Mullen et al. | |
| 9,619,741 B1 | 4/2017 | Rigatti | |
| 9,639,796 B2 | 5/2017 | Mullen et al. | |
| 9,646,240 B1 | 5/2017 | Mullen et al. | |
| 9,652,436 B1 | 5/2017 | Yen et al. | |
| 9,665,879 B2* | 5/2017 | Aloni | G06Q 30/0236 |
| 9,684,861 B2 | 6/2017 | Mullen et al. | |
| 9,684,899 B1* | 6/2017 | Mohsenzadeh | G06Q 20/00 |
| D792,511 S | 7/2017 | Mullen et al. | |
| D792,512 S | 7/2017 | Mullen et al. | |
| D792,513 S | 7/2017 | Mullen et al. | |
| 9,697,454 B2 | 7/2017 | Mullen et al. | |
| 9,704,088 B2 | 7/2017 | Mullen et al. | |
| 9,704,089 B2 | 7/2017 | Mullen et al. | |
| 9,710,745 B1 | 7/2017 | O'Shea | |
| 9,721,201 B1 | 8/2017 | Mullen et al. | |
| 9,721,425 B2* | 8/2017 | Irwin, Jr. | G06Q 30/00 |
| 9,727,813 B2 | 8/2017 | Mullen et al. | |
| 9,734,669 B1* | 8/2017 | Mullen | G07F 17/329 |
| 9,773,212 B2* | 9/2017 | Hammad | G06Q 10/00 |
| 9,792,592 B2* | 10/2017 | Delolme | G06Q 20/3227 |
| 9,805,297 B2 | 10/2017 | Mullen et al. | |
| 9,818,125 B2 | 11/2017 | Mullen et al. | |
| 9,836,680 B1 | 12/2017 | Cloutier | |
| 9,852,368 B1 | 12/2017 | Yen et al. | |
| 9,852,428 B2* | 12/2017 | King | G06Q 30/00 |
| 9,875,437 B2 | 1/2018 | Cloutier et al. | |
| 9,881,245 B1 | 1/2018 | Rhoades et al. | |
| 9,881,306 B2* | 1/2018 | Gannon | G06Q 20/405 |
| 9,916,992 B2 | 3/2018 | Mullen et al. | |
| 9,928,456 B1 | 3/2018 | Cloutier et al. | |
| 9,934,669 B2* | 4/2018 | Hwang | H04W 4/021 |
| 9,953,255 B1 | 4/2018 | Yen et al. | |
| 9,965,757 B2* | 5/2018 | Bhinder | G06Q 20/32 |
| 10,022,884 B1 | 7/2018 | Cloutier | |
| 10,032,100 B2 | 7/2018 | Mullen et al. | |
| 10,032,156 B2* | 7/2018 | Al-Sahli | G06Q 20/1085 |
| 10,049,385 B2* | 8/2018 | Killoran, Jr. | G06Q 10/107 |
| 10,055,614 B1 | 8/2018 | Cloutier et al. | |
| 10,062,024 B1 | 8/2018 | Bohac, Jr. | |
| 10,095,970 B1 | 10/2018 | Mullen | |
| 10,095,974 B1 | 10/2018 | Mullen et al. | |
| 10,127,550 B2* | 11/2018 | Mohsenzadeh | G06Q 20/00 |
| 10,169,692 B2 | 1/2019 | Mullen et al. | |
| 10,169,693 B1 | 1/2019 | Batra | |
| 10,176,419 B1 | 1/2019 | Cloutier et al. | |
| 10,176,423 B1 | 1/2019 | Mullen et al. | |
| 10,181,097 B1 | 1/2019 | Mullen et al. | |
| 10,198,687 B2 | 2/2019 | Mullen et al. | |
| 10,223,631 B2 | 3/2019 | Mullen et al. | |
| 10,255,545 B2 | 4/2019 | Mullen et al. | |
| 10,275,582 B2* | 4/2019 | Carlson | G06F 21/31 |
| 10,318,980 B2* | 6/2019 | Crowe | G06Q 30/02 |
| 10,325,199 B2 | 6/2019 | Mullen et al. | |
| 10,402,897 B1* | 9/2019 | Czyzewski | G06Q 40/02 |
| 10,430,704 B2 | 10/2019 | Mullen et al. | |
| 10,430,845 B2* | 10/2019 | Koretz | G06Q 30/0603 |
| 10,467,521 B2 | 11/2019 | Mullen et al. | |
| 10,482,363 B1 | 11/2019 | Cloutier et al. | |
| 10,496,918 B2 | 12/2019 | Mullen et al. | |
| 10,504,105 B2 | 12/2019 | Mullen et al. | |
| 10,552,883 B2* | 2/2020 | Yoder | G06Q 20/387 |
| 10,579,920 B2 | 3/2020 | Mullen et al. | |
| 10,657,588 B2* | 5/2020 | Stewart | G06Q 20/10 |
| 10,693,263 B1 | 6/2020 | Mullen et al. | |
| 10,936,926 B1 | 3/2021 | Rhoades et al. | |
| 10,948,964 B1 | 3/2021 | Cloutier | |
| 10,997,489 B2 | 5/2021 | Mullen et al. | |
| 11,062,195 B2 | 7/2021 | Mullen | |
| 11,144,909 B1 | 10/2021 | Mullen et al. | |
| 11,238,329 B2 | 2/2022 | Mullen et al. | |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0139985 A1* | 7/2003 | Hollar | G06Q 40/12 |
| | | | 705/30 |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0039635 A1 | 2/2004 | Linde et al. | |
| 2004/0128195 A1 | 7/2004 | Sorem | |
| 2004/0133787 A1 | 7/2004 | Doughty | |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0043997 A1 | 2/2005 | Sohata et al. | |
| 2005/0060261 A1* | 3/2005 | Remington | G06Q 20/108 |
| | | | 705/40 |

(56) References Cited

U.S. PATENT DOCUMENTS

| | | |
|---|---|---|
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0223392 A1* | 10/2005 | Cox ................. G06Q 10/06 719/328 |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0129955 A1 | 6/2007 | Dalmia et al. |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192215 A1 | 8/2007 | Taylor et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0048916 A1 | 2/2009 | Nuzum et al. |
| 2009/0106159 A1 | 4/2009 | Delolme et al. |
| 2009/0108064 A1 | 4/2009 | Fernandes et al. |
| 2009/0150237 A1 | 6/2009 | Gupta et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0198617 A1* | 8/2009 | Soghoian ............... G06Q 20/04 705/65 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0198574 A1* | 8/2010 | Veller .................. G06F 30/33 703/14 |
| 2011/0028184 A1 | 2/2011 | Cooper |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0158654 A1* | 6/2012 | Behren ................ G06Q 30/06 707/769 |
| 2012/0185397 A1* | 7/2012 | Levovitz ............. G06Q 20/32 705/71 |
| 2012/0197708 A1 | 8/2012 | Mullen et al. |
| 2012/0209744 A1 | 8/2012 | Mullen et al. |
| 2012/0254037 A1* | 10/2012 | Mullen ............. G06Q 30/0239 705/44 |

(56) References Cited

U.S. PATENT DOCUMENTS

| | | | |
|---|---|---|---|
| 2012/0254038 A1* | 10/2012 | Mullen | G07F 7/0806 |
| | | | 705/44 |
| 2012/0285972 A1* | 11/2012 | Fu | B65D 81/3869 |
| | | | 220/592.2 |
| 2012/0286037 A1 | 11/2012 | Mullen et al. | |
| 2012/0286928 A1 | 11/2012 | Mullen et al. | |
| 2012/0286936 A1 | 11/2012 | Mullen et al. | |
| 2012/0290449 A1 | 11/2012 | Mullen et al. | |
| 2012/0290472 A1 | 11/2012 | Mullen et al. | |
| 2012/0318871 A1 | 12/2012 | Mullen et al. | |
| 2012/0326013 A1 | 12/2012 | Cloutier et al. | |
| 2013/0020396 A1 | 1/2013 | Mullen et al. | |
| 2013/0217152 A1 | 8/2013 | Mullen et al. | |
| 2013/0282573 A1 | 10/2013 | Mullen et al. | |
| 2013/0282575 A1 | 10/2013 | Mullen et al. | |
| 2014/0054384 A1 | 2/2014 | Cloutier et al. | |
| 2015/0186766 A1 | 7/2015 | Mullen et al. | |
| 2016/0162713 A1 | 6/2016 | Cloutier et al. | |
| 2016/0180209 A1 | 6/2016 | Mullen et al. | |
| 2016/0239735 A1 | 8/2016 | Mullen et al. | |
| 2016/0283837 A1 | 9/2016 | Mullen et al. | |
| 2016/0307085 A1 | 10/2016 | Mullen et al. | |
| 2016/0335529 A1 | 11/2016 | Mullen et al. | |
| 2016/0342876 A1 | 11/2016 | Mullen et al. | |
| 2016/0342877 A1 | 11/2016 | Mullen et al. | |
| 2016/0342878 A1 | 11/2016 | Mullen et al. | |
| 2016/0342879 A1 | 11/2016 | Mullen et al. | |
| 2016/0342880 A1 | 11/2016 | Mullen et al. | |
| 2017/0286817 A1 | 10/2017 | Mullen et al. | |
| 2017/0300796 A1 | 10/2017 | Mullen et al. | |
| 2018/0012226 A1* | 1/2018 | Phillips | G06Q 20/4016 |
| 2018/0053079 A1 | 2/2018 | Cloutier et al. | |
| 2018/0060881 A1 | 3/2018 | Mullen et al. | |
| 2018/0151391 A1 | 5/2018 | Mullen et al. | |
| 2019/0026613 A1 | 1/2019 | O'Shea | |
| 2019/0042903 A1 | 2/2019 | Cloutier et al. | |
| 2019/0065928 A1 | 2/2019 | Mullen et al. | |
| 2019/0197387 A1 | 6/2019 | Mullen et al. | |
| 2019/0340484 A1 | 11/2019 | Mullen et al. | |
| 2020/0051050 A1* | 2/2020 | Liu | G06Q 20/105 |
| 2020/0074555 A1* | 3/2020 | Cruttenden | G06Q 20/20 |
| 2020/0082383 A1 | 3/2020 | Mullen et al. | |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

CARDS, DEVICES, SYSTEMS, AND METHODS FOR FINANCIAL MANAGEMENT SERVICES

CROSS-REFERENCE TO RELATED APPLICATION

This application claims the benefit of U.S. Provisional Patent Application No. 61/624,377, titled "CARDS, DEVICES, SYSTEMS, AND METHODS FOR FINANCIAL MANAGEMENT SERVICES," filed Apr. 15, 2012, which is hereby incorporated by reference herein in its entirety.

BACKGROUND OF THE INVENTION

This invention relates to magnetic cards and devices and associated payment systems.

SUMMARY OF THE INVENTION

Systems and methods are provided for allowing a user to select an additional service to be performed in addition to the payment of goods with a payment card or other device (e.g., a mobile telephonic device, a tablet computer device, or another electronic device). A card, or other device, may include one or more buttons. A user may associate an additional service to a button of a card at any time. At the time of purchase, information indicative of the button that the user selected may be passed to a point-of-sale system with a user's payment information. Such data may be, for example, communicated through a merchant acquirer's network to a processing facility. The processing facility may, for example, authorize a payment transaction and forward the information indicative of the button a user selected and the identity of a user to a remote facility. Such a remote facility may, for example, forward at least some of such information, as well as additional information, to a third party application such that the third party application enacts the additional feature desired by the user.

Such an additional feature may include, for example, a game action in an online game by a game application, a check-in operation at a location by a check-in application, redemption of a coupon or voucher by a third party application, accumulation of loyalty points by a third party loyalty application, rating of a transaction or location by a rating application, any combination of such features, or any additional feature.

Selection of an application may be provided, for example, by a Graphical User Interface (GUI) provided on a computing device (e.g., a mobile telephonic device) as a software application for that device or via the internet or an intranet through a web browser. Such a selection may be provided with a non-powered card such that a single feature may be associated with a card for a period of time. Such a selection may be associated to an option (e.g., a button) on a powered card or other device (e.g., a mobile telephonic device) such that the user may associate different features with different options (e.g., different buttons). Accordingly, for example, a user may receive a powered card, or other device, in the mail and use his/her web browser to associate different additional features to different buttons. The user may then utilize the card in a store and press a button in order to select that feature. A card, or other device, may download information (e.g., via a wireless communication such as a light or electromagnetic communication) such that the card, or other device, displays information next to an option indicative of the application (e.g., "Redeem LivingSocial Voucher" or "Facebook Like"). Alternatively, no download may be provided and no additional information may be displayed such that a user's card, or other device, includes a generic descriptor (e.g., "credit" and "application," or "application 1" and "application 2," or "debit" and "application 1" and "application 2").

A remote facility may also receive additional information other than just a user identifier and information indicative of the option selected by a user (or that the user made a payment). Such additional information may be, for example, the type of merchant (e.g., a retail merchant or a gas merchant), the location of a merchant (e.g., the zip code of a merchant), the type of transaction (e.g., online or in-store purchase), the name of the merchant (e.g., "Amazon.com," or "Walmart"), the amount of the transaction (e.g., $10.25), and any other information. Such a remote facility may forward such information to a third party application in addition to information generated by the remote facility (e.g., a second user identifier such that different identifiers are used with the facility sending payment information and the third party application).

An ecosystem may be provided in which a development kit is available for third parties to develop applications for payment cards or other devices. A GUI may be provided where a user can select different third party applications to be associated with a user's payment. The third party applications may need to be approved by an administrator before being accessible by a GUI. Different categories of third party applications may be provided on the GUI (e.g., a coupon category, a check-in category, a games category, a financial management tools category). The development kit may provide the ability for a third party application to, for example, receive user identification numbers and other information (e.g., merchant name and location) and provide particular information back (e.g., within a period of time) to a remote facility.

Information received from a third party application may include, for example, information indicative that the user was properly identified and a service was performed (e.g., "check-in completed," "information added to financial management service."). Such information may be provided back to an issuing bank, processor, or other service provider such that the information may be displayed on a user's bill statement. Additional information may also be provided that may change the way a transaction is authorized or settled.

Additional information received from a third party may be utilized to change the way a transaction is authorized or settled. For example, a third party may provide a user with the ability to pre-purchase a voucher to a particular store (e.g., a particular barber in a particular zip code). A user may associate this third party service to a button on the user's card. A user may make a purchase at this barber multiple times during a year on the user's credit account. The user may, at one such purchase, press the button associated with the desire to use the third party service and redeem a voucher the user already purchased or acquired. Information indicative of the user's desire to utilize such a service may be communicated to a point-of-sale terminal via a communications device located on the card (e.g., a dynamic magnetic stripe communications device, an RFID antenna, an exposed IC chip (e.g., an EMV chip, or any other communications device). The transaction may be authorized using the user's payment account if, for example, the user has enough funds associated with that account (e.g., a credit or debit account). The third party service provider may then determine the user had a pre-paid voucher for the transaction and may return to the card issuer, processor, or other party information indicative that the user's bill is to be adjusted by the amount of the voucher. Before, or after, settlement occurs a user's bill may show a statement credit in the amount of the voucher. A remote facility may perform such a data exchange as well as any associated value exchange. For example, the remote facility may, for a fee (e.g., a percentage of a transaction or a fixed fee), provide value from the third party service provider to the card issuer or processor (e.g., via an ACH or other type of monetary transaction). Alternatively, for example, the remote facility may provide the desired value to the card issuer, processor, or other party and demand the associated value be paid to the remote facility by the third party application within a period of time (e.g., three days). Information provided by a third party application to a remote facility may include an identifier indicative of the third party application, an identifier indicative of the user, an identifier indicative of the type of service provided by the third party application, an identifier indicative of the transaction with which further action by the third party application is desired, an amount of a post-statement credit that is to be applied for a particular transaction, and amount of a post-settlement credit that is to be applied for a particular transaction, an amount of a pre-settlement credit that is to be applied for a particular transaction, an amount of a credit that is to be applied during an authorization, an additional fee that is supposed to be added to a statement for an additional service (e.g., a fee-based financial management tool service), and any other information desired by the third party service provider, processor, card issuer, remote facility, device provider, or any other entity (e.g., a card network).

Information indicative of a button press, or use of a card, that triggers a feature may be provided in a payment message utilized at authorization or at settlement. Furthermore, the service provider may return information in a period of time that permits actions to be performed pre-authorization or pre-settlement.

The payment actions may be determined, for example, via a user interaction with the card. Particularly, for example, a user may press a button on the card, from a group of buttons, that is associated with the third party feature. Such third party features may be unique from the features provided to the user via the third parties non-payment card or device services. Accordingly, a user may obtain the benefit of the whimsical and festive nature of a unique feature every time the user makes a payment. Information indicative of feature selection may be provided, for example, via an output device operable to be read by a card reader. For example, the feature may be provided by a dynamic magnetic stripe communications device, an RFID antenna, an exposed IC chip, or any other type of card reader. For online purchases, for example, a display may be provided on the card and a user selection may cause a particular number (e.g., a particular code) to be displayed on the card. Such a code may be entered into a text box on a website at checkout and may be representative of the user's desired feature. Accordingly, the feature may be communicated to a remote server such that the feature may be performed in the third party service on behalf of the user. The code may additionally provide the benefits of a security code and may be entered with a payment card number (e.g., a credit or debit card number) at online or in-store checkout.

Rewards may be awarded based on the amount of a purchase. Such rewards may be associated with a third party service or a card issuer, device or card provider, or other entity. For example, an amount of game currency may be awarded by a game provider at every purchase instead of a card issuer providing an amount of points, miles, or cashback to a user. Alternatively, for example, a user may earn both rewards from a card issuer as well as rewards from a third party service provider. A user may select, via, for example, physical buttons on the card or virtual buttons on a capacitive-sensitive display of a mobile telephonic device, the type of feature the user desires. Multiple features may be provided from a particular third party service provider. For example, a game service provider may provide a feature associated with one game action and another feature associated with another game action.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A payment card or other device may receive information indicative of a feature desired to be added by a user. The payment card may communicate information indicative of the feature with payment card data associated with the card or a user selection. The payment data and feature information may be routed, for example, to an authorization server. The authorization server may authorize payment and, based on the authorized payment, communicate the feature information to a remote server. The remote server may utilize this remote information to impact a third party service. The feature information may, for example, be routed before the payment card data reaches an authorization server. At merchant settlement, charge backs for a purchase associated with a game action may cause the feature to be reversed or a different feature to be implemented (e.g., a removal of rewards earned at authorization). The feature may be implemented at settlement upon confirmation that, for example, no chargeback was associated with the payment transaction.

A financial management system may be implemented to control the accounting of transactions processed by a remote facility. The financial management system may include a financial processor that may render an accounting programming language (APL) interface onto a graphical user interface. Appropriate selection of entries via the APL may cause executable code to be generated and then executed by the financial processor to effect the accounting of transactions processed by a financial processor. Alternatively, appropriate selection of entries via the APL may be accessed by executable applications already running on the financial processor to effect the accounting of transactions processed by a financial processor.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
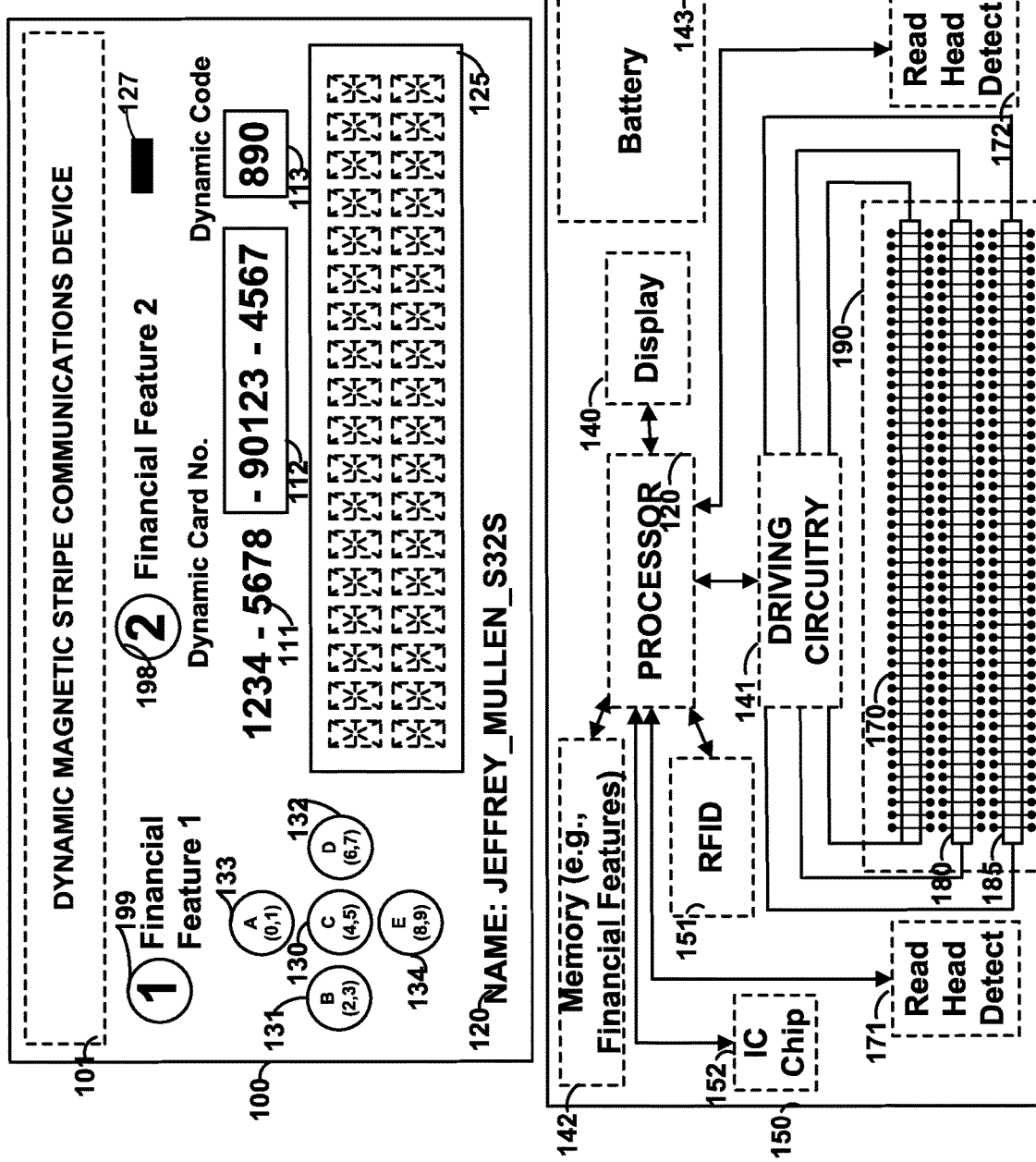
FIG. 1 is an illustration of a card and architecture constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Card 100 may include button 199. Button 199 may be used, for example, to communicate information through dynamic magnetic stripe communications device 101 indicative of a user's desire to communicate details of a financial transaction to a third-party service provider. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate details of a financial transaction to a different third-party service provider as may be selected by pressing button 199). Multiple buttons may be provided on a card and each button may be associated with different user selections. Light sensor 127 may be provided, for example, to receive information from a display (e.g., a display of a mobile telephonic device or a laptop computer). Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction. Button 198 and button 199 may each be associated with, for example, a different third party service provider feature and may be changed by a user at any time. The third party feature associated with a button may be changed by a user on a GUI provided by a device provider, remote facility provider, card issuer, processor, or any other entity. For example, a third party service provider may, on its website or application, allow a user to change the third party feature performed when the third parties feature button is selected by a user on the user's card or other device. For example, suppose a third party service provider provides a check-in feature at particular stores and then presents the fact that the user has checked into a location on a profile page of the user. One action may be to check-into the location using a payment transaction as the check-in. When a transaction is performed, a user's profile may be updated that the user has checked-into that location. When a purchase transaction is performed, a user's profile may be updated that the user has made a purchase at the check-in. Another action may be to use a purchased product as the check-in. When a transaction is performed, a user's profile may be updated that the user has made a purchase of a particular item at the check-in. For example, a user may be provided with a GUI (e.g., on a mobile telephonic device of the user) when the user makes a purchase to identify the goods that the user has purchased. In doing so, features may be enhanced with additional information from a user after a purchase has been made.

The selection of a feature may or may not have a cost associated with it. If a cost is associated with the feature, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third party service provider. A cost may be associated with a feature selection, but may not be a cost to a user. Instead, for example, the cost may be a cost to a third party service provider. The cost may be provided, for example, to other entities such as, for example, the device provider, card issuer, card processor (which may be the same, for example, as the card issuer), or any other entity (e.g., card network).

Architecture 150 may be utilized with any card. Architecture 150 may include processor 120. Processor 120 may have on-board memory for storing information (e.g., financial features). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data, for example, that is unique to a particular card. Memory 142 may include any type of data. For example, memory 142 may store discretionary data codes associated with buttons of a card (e.g., card 100 of FIG. 1). Such codes may be recognized by remote servers to effect particular actions. For example, a code may be stored on memory 142 that causes a third party service feature to be performed by a remote server (e.g., a remote server coupled to a third party service such as an online voucher or coupon provider). Different third party features may be associated with different buttons. Or, for example, a user may scroll through a list of features on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors. Light sensors may be utilized such that a display screen, or other light emitting device, may communicate information to light sensors 127 via light.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, a light sensor. Architecture 150 may receive information from a light sensor. Processor 120 may determine information received by a light sensor.

Figure 2:
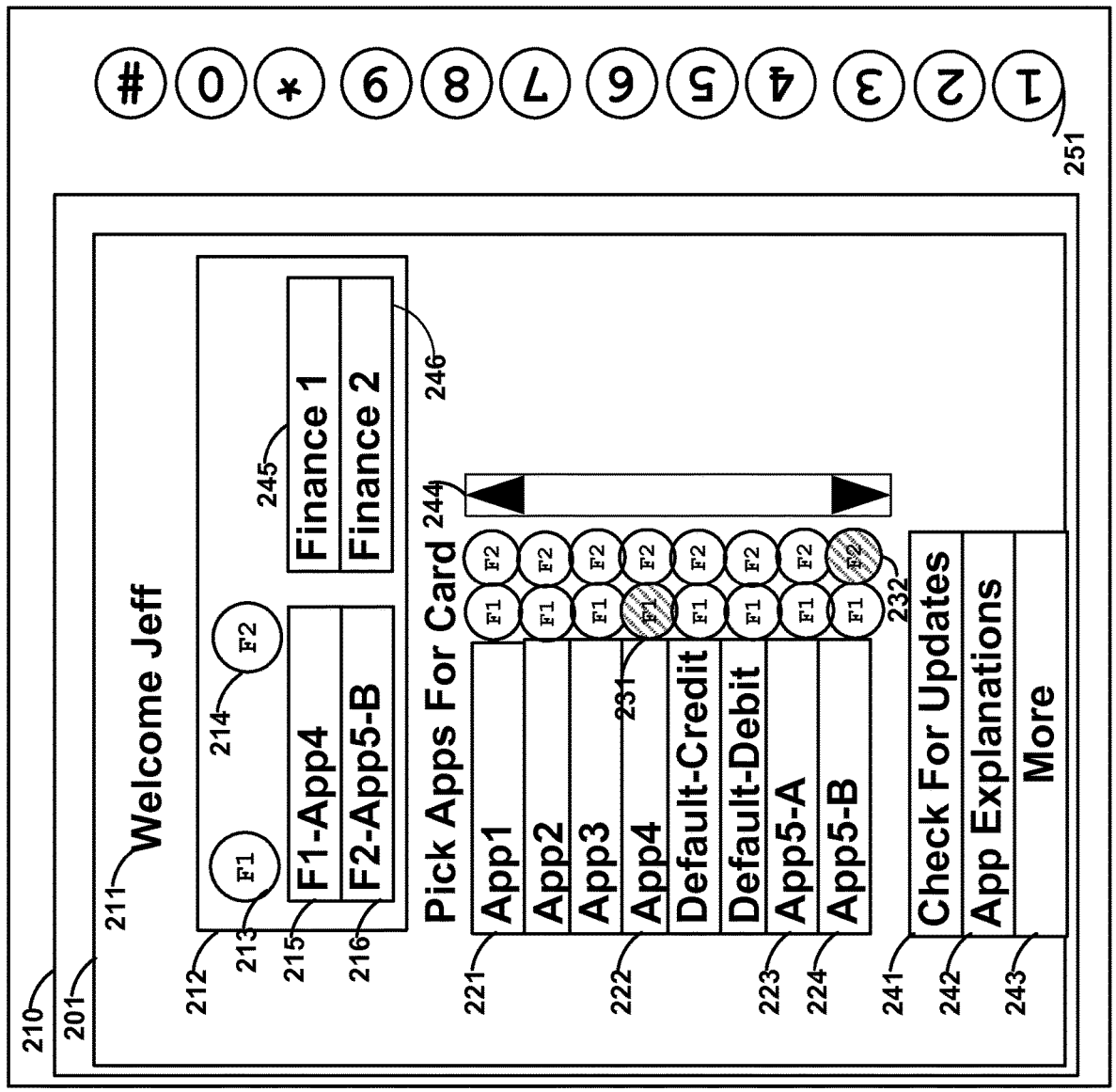
FIG. 2 is an illustration of a device constructed in accordance with the principles of the present invention.

FIG. 2 shows device 200. Device 200 may include one or more physical buttons 251, display screen 210 (e.g., a touch display screen such as a capacitive-touch or resistive-touch display screen), GUI 201, text 211, virtual card 212, virtual indicia 213 and 214, field descriptors 215 and 216, financial messages 245 and 246, applications 221-224, selection options 231, 232, and 241-243.

A user may associate a card, such as a powered or non-powered card, with an application manager for managing third party service features. Such an application manager may be provided, for example, on a remote facility and displayed on a graphical user interface to allow a user to change the third party service features associated with a card. In this manner, a user may utilize a GUI to be provided with an ecosystem of applications and may, for example, select, at any time, a particular feature to associate with a card or a card button. Persons skilled in the art will appreciate that a default feature may be provided or that a number of features provided by a card issuer or entity may be provided in addition to third party service features. For example, a card issuer may provide a card with a default on one button for credit and a default for a second button as decoupled debit. A user may press the first button to perform a credit transaction. A user may press the other button to perform a decoupled debit transaction.

Virtual card 212 may be provided as a representation of a user's physical card associated with an application manager. A user may be provided with the ability to change between multiple physical cards and configure the features associated with those multiple physical cards. Accordingly, virtual card 212 may be provided with indicia 213 in the configuration of, and indicative of, one physical button associated with a user's physical card and virtual card 212 may be provided with indicia 214 in the configuration of, and indicative of, another physical button associated with a user's physical card. Fields 215 and 216 may include the features associated with each button. Accordingly, a user may, for example, view virtual card 212 in order to refresh the user's memory on the features associated with the physical buttons on a user's physical card (not shown). GUI 201 may be, for example, provided as an application for a device (e.g., a portable computing device or a mobile telephonic device) or retrieved information from a web browser. Text 211 may, for example, identify the user associated with virtual card 212 and the corresponding physical card (not shown).

A list of applications may be provided on a card. Such applications may provide features for a third party service provider. A user may, for example, select that different applications be associated with a particular card or a particular button on a card. For example, selection 231 may associate application 222 to the physical button of a card associated with virtual button 213. Selection 232 may associate application 224 to the physical button of a card associated with virtual button 214. In doing so, a user may change the features of a card by using GUI 201. A physical card (not shown) may communicate information indicative of the button that was pressed with other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., an NFC message from a radio frequency antenna), or an exposed IC chip message (e.g., an EMV message) from an exposed IC chip. Such information may be passed to a card issuer or processor from a point-of-sale and any intermediary devices (e.g., a merchant acquirer processing server) and the information may be passed to a remote facility (e.g., a facility providing an application manager) such that the remote facility may determine the button that was pressed by a user. This remote facility may, in turn, retrieve information associated with the third party feature (or a feature of a card issuer, processor, application manager provider, or any entity) and forward information to that feature provider such that the feature may be performed. Additional information may be returned to the entity that provided the information indicative of the button the user pressed. Persons skilled in the art will appreciate that if, for example, a non-powered card is utilized then information indicative that a purchase was made may be provided to an application manager provider such that the application manager provider can initiate the desired feature for the non-powered card. For non-powered cards, for example, features may be associated with different types of purchases such as, for example, one feature may be provided for a particular merchant type (e.g., a game feature for gas purchases) and another feature may be provided for a different merchant type (e.g., a reward feature for transportation purchases). Features may be associated with other characteristics of a purchase such as, for example, a purchase above a particular amount (e.g., at or above $100) or a purchase below a particular amount (e.g., below $100). Such additional feature selections may be provided, for example, for powered cards and devices.

GUI 201 may be provided, for example, on a card issuer's website such as, for example, on a bill statement web page. GUI 201 may be provided, for example, above the bill statement or to the right of the bill statement. Accordingly, for example, a user may utilize the application manager to manage application features when the user is logged into his/her account. Similarly, a third party service provider may utilize GUI 201 as part of a user's administration or experience of that third party service. Accordingly, for example, a user's profile page for a third party service may include GUI 201. In this manner, application manager provider may provide web-code that retrieves GUI 201 from a remote facility managed by the application manager provider. Selection 241 may be utilized by a user to check for updates (e.g., confirm that a feature was changed or if any updates are present). Selection 242 may be utilized to explain the functionality of a particular application feature. Selection 243 may be utilized for additional selection options. Scroll tool 244 may be used, for example, to scroll through a list of applications and selection options.

A card may be provided with one button for a particular payment account (e.g., credit) and one button for a changeable feature. Accordingly, a user may, for example, only need to remember one feature associated with a card. A credit account may include rewards such as points, cashback, or miles from the card issuer. Accordingly, pushing the payment account button may earn the user such rewards. Pushing the changeable feature button may, alternatively, for example, not earn the user such rewards and may instead initiate a changeable feature. In doing so, for example, the cost of providing a card may be reduced in that the cost of rewards for the card may be reduced. A feature may include, for example, a feature from the card issuer, such as the ability for a user to earn a particular amount of points (e.g., 100) for a particular dollar amount added to a purchase (e.g., $1).

An application associated with a changeable feature button may, for example, initiate a financial transaction (e.g., a piggyback transaction) to occur in addition to a purchase transaction being initiated by a card or device. For example, a changeable feature button may be pressed and associated payment information may be communicated that may cause a third party to charge additional funds as a second transaction (e.g., a piggyback transaction) that may be associated with a first transaction. Accordingly, for example, a customer may receive goods and/or services from the third party once the piggyback transaction settles in addition to any goods and/or services that may have been purchased by the customer during the first transaction. A remote processing facility may, for example, provide a configurable financial management system to manage the financial transactions that may be associated with an original purchase or action (e.g., piggyback transactions, statement credit transactions, return transactions, partial return transactions, adjustments and chargebacks).

Figure 3:
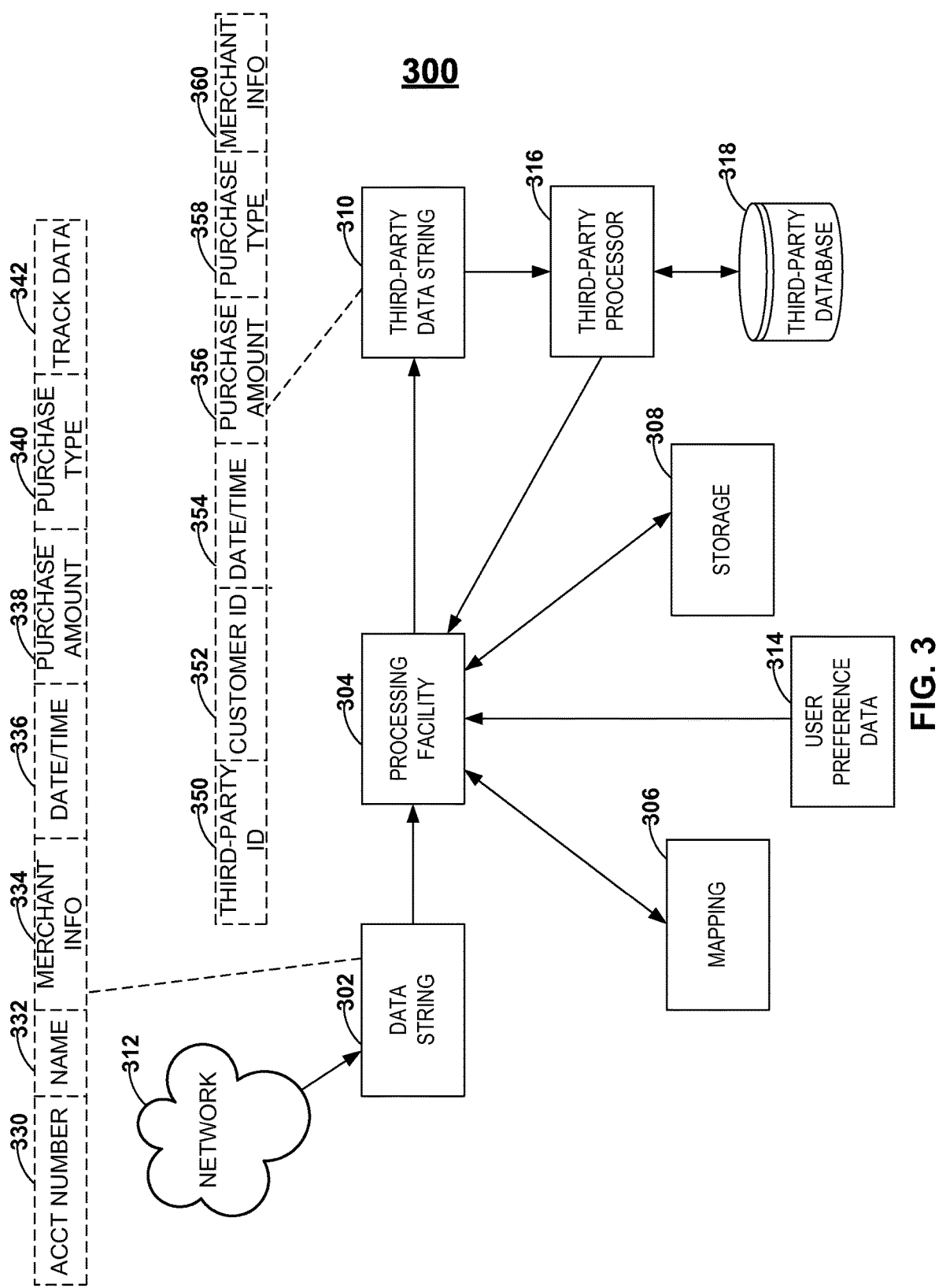
FIG. 3 is an illustration of a data flow constructed in accordance with the principles of the present invention.

FIG. 3 shows data flow 300 that may, for example, include network 312 (e.g., a network of issuers, merchants, merchant acquirers/processors, and any other network entity), data string 302, processing facility 304, mapping 306, storage 308, user preference data 314, third-party data string 310, third-party processor 316, and third-party database 318.

A user may, for example, initiate a purchase transaction within network 312, such that the user may have requested additional functionality associated with the transaction. A user may, for example, complete a purchase transaction establishing a communication (e.g., an electromagnetic communication) between the user's payment device and a merchant's point-of-sale terminal where a payment message (e.g., a magnetic stripe payment message) may be communicated to complete the purchase transaction and additional information (e.g., information associated with a particular button on the user's payment device) may be communicated (e.g., communicated within discretionary data fields within the magnetic stripe message) to a network entity.

The payment message may be received by a network entity (e.g., an issuer and/or a processor) within network 312 to complete the requested purchase transaction. The network entity may, for example, forward a data string (e.g., data string 302) to processing facility 304 based on the requested purchase transaction. Data string 302 may, for example, contain data associated with the purchase transaction (e.g., payment account number, payment account holder's name, track data, merchant type, merchant location, types of goods purchased, amount of purchase, and transaction type).

Processing facility 304 may receive data string 302 and may process data string 302 (e.g., parse data string 302) to obtain individual data components contained within data string 302. Accordingly, for example, processing facility 304 may separate information pertaining to purchase authorization (e.g., payment account number and cardholder name) from information pertaining to, for example, the shopping habits of the user (e.g., merchant info, date/time of purchase, purchase type and purchase amount). Data string 302 may, for example, contain magnetic stripe data 342 (e.g., Track 1 data and Track 2 data). Data string 302 may, for example, contain a subset of magnetic stripe data (e.g., discretionary data fields contained within Track 1 and/or Track 2 data).

Mapping 306 may, for example, exist locally within processing facility 304. Mapping 306 may, for example, be accessed remotely by processing facility 304. Enhanced digital and/or physical security measures may be taken to protect the contents of mapping 306 from unauthorized access.

A data lookup function may be performed by processing facility 304, such that account identifying information (e.g., account number 330) may be provided to mapping 306. Mapping 306 may receive the account identifying information and may return a corresponding customer identification. For example, mapping 306 may be a database containing payment account numbers associated with one or more users. Each payment account number contained within mapping 306 may, for example, correlate to an associated customer ID (e.g., a token uniquely associated with the user).

Processing facility 304 may scrub data string 302 to remove sensitive information from data string 302. For example, sensitive information (e.g., account number 330 and account holder name 332) of data string 302 may be stripped by processing facility 304 and replaced with customer information received from mapping 306. Accordingly, for example, sensitive purchase account information associated with each data string 302 may be destroyed once data string 302 is correlated to its associated customer ID. In so doing, for example, a scrubbed and sanitized version of data string 302 may be stored within storage 308.

Processing facility 304 may retrieve scrubbed and sanitized information from storage 308. Storage 308 may, for example, exist locally within processing facility 304. Storage 308 may, for example, be accessed remotely by processing facility 304.

Processing facility 304 may retrieve information from storage 308 and may, for example, generate third-party data string 310 for delivery to third-party applications. Third-party data string 310 may, for example, contain information that may be value added to third-party applications and may be devoid of sensitive information associated with users.

Third-party data string 310 may, for example, contain third-party ID 350, which may be generated by processing facility 304 in response to information (e.g., discretionary data fields of track data 342) and user preference data 314. For example, track data 342 when construed in association with user preference data 314 may indicate which third-party application is to receive third-party data string 310. Accordingly, for example, processing facility 304 may generate third-party ID 350 in accordance with track data 342 and user preference data 314. Track data 342 in association with user preference data 314 may, for example, define what types and quantities of information are to be provided within third-party data string 310. Accordingly, for example, one or more data fields (e.g., data fields 354-360) may be populated within third-party data string 310 in accordance with track data 342 and associated user preference data 314. Merchant info 360 may be provided in greater detail (e.g., may include both the name and address of the merchant) as compared to merchant info 334 which may contain only general data about the merchant (e.g., name only).

Third-party data string 310 may, for example, contain customer ID 352, which may be generated by processing facility 304 in response to information (e.g., a unique customer token) that may be contained within storage 308. Customer ID 352 may, for example, depend at least in part upon which third-party application is to receive third-party data string 310 (e.g., as may be defined by third-party ID 350). For example, a user may be associated with several third-party applications. Accordingly, for example, one user may be associated with multiple customer IDs. In so doing, for example, third-party data string 310 may contain customer ID 352 that is different for each third-party ID 350, but nevertheless identifies the same user.

One of many third-party processors (e.g. third-party processor 316) may receive third-party data string 310. Customer ID 352 may uniquely identify which user may be associated with third-party data string 310. Accordingly, for example, third-party processor 316 may initiate one or more transactions on behalf of the user depending upon which of the one or more transactions the user has selected (e.g., as determined by user preference data within third-party database 318) to be associated with the transaction that caused data string 302 to be received by processing facility 304.

For example, a user may define user preference data (e.g., as may be stored within third-party database 318) to direct third-party processor 316 to charge additional funds against the user's payment account after third-party data string 310 is received. Such additional funds may, for example, be used to purchase goods and/or services that may be offered by a third party (e.g., a collection of sports memorabilia cards from UpperDeck). Accordingly, for example, upon receipt of third-party data string 310, third-party processor 315 may request processing facility 304 to process a payment for goods and/or services provided by the third party in accordance with configurable information (e.g., user configurable information within database 318).

Figure 4:
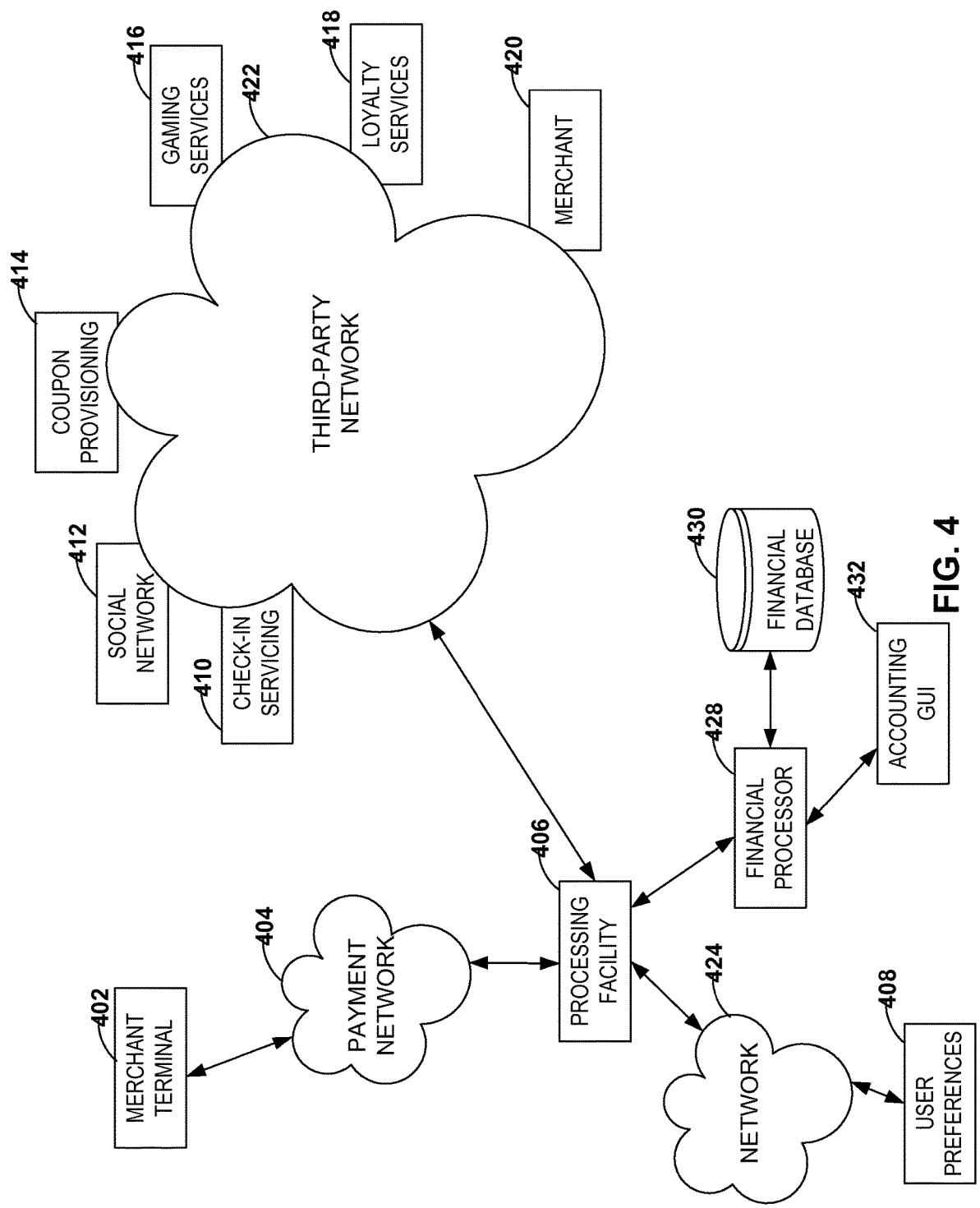
FIG. 4 is an illustration of a network constructed in accordance with the principles of the present invention.

FIG. 4 shows network 400 that may include third-party network 422 and various third-party applications 410-420. Network 400 may, for example, include merchant terminal 402 (e.g., a magnetic stripe reader, an EMV reader, an RFID reader, or an NFC reader) that may accept transactions (e.g., point-of-sale transactions) and may complete such transactions via payment network 404. Payment network 404 may, for example, include issuers, merchant acquirers, processors, and/or other network entities that may be required to process and settle transactions initiated by merchant terminal 402.

Processing facility 406 may, for example, receive messages from payment network 404 (e.g., from a processor within payment network 404) that may be related to at least a portion of transactions conducted within payment network 404. Customers associated with processing facility 406 may, for example, elect to distribute at least a portion of data processed within payment network 404 with the various third-party applications of third-party network 422.

User preferences 408 may be selected by each customer to, for example, define what data, if any, may be provided to processing facility 406 by payment network 404. A customer may select (e.g., via user preferences 408) at least a portion of the data provided by payment network 404 to processing facility 406 that may be shared with third-party applications 410-420.

Network 424 (e.g., the internet) may be accessed by a user to define user preferences 408, which may determine how payment network 404, processing facility 406, third-party network 422, and third-party applications 410-420 interact for every transaction conducted by each user. A user may, for example, present a non-powered card to merchant terminal 402 to complete a particular purchase transaction. User preferences 408 may, for example, be defined by the user to allow details of such a transaction to be communicated by payment network 404 to processing facility 406, which may then share at least a portion of such details with one or more third-party applications 410-420. A customer may, for example, present a powered card to merchant 402 to complete a purchase transaction. Prior to presentment, the customer may have selected (e.g., via one or more button presses on the powered card) one or more additional actions to be taken besides the processing of a purchase transaction by payment network 404 in accordance with user preferences 408.

A user may, for example, press a button on a powered card that may be associated with communicating a payment message (e.g., a magnetic stripe message) to merchant terminal 402. Such a button press may, for example, further populate the magnetic stripe message (e.g., populate a discretionary data field within the magnetic stripe message) with a directive to share at least a portion of purchase transaction details conducted at merchant terminal 402 with a particular third-party application (e.g., merchant 420). User preferences 408 may, for example, be selected by the user to determine which actions are to be conducted by the third-party application.

A user may press a button on a powered card that in accordance with user preferences 408 may, for example, cause a data string to be communicated from payment network 404 (e.g., from a processor within payment network 404) to processing facility 406 that may contain details of a purchase transaction initiated at merchant terminal 402. Processing facility 406 may, for example, compare user information (e.g., payment account number and/or payment account holder's name) that may be contained within the data string to a user database to obtain a customer ID (e.g., a customer token) that may be associated with the user information. Sensitive information within the data string (e.g., payment account number and/or payment account holder's name) may be replaced with the customer token and then stored either locally within processing facility 406 or remotely.

The data string, for example, may further contain information that may be indicative of which button was pressed on the powered card before being presented to merchant terminal 402. Using the button press information in addition to user preferences 408, processing facility 406 may populate a third-party message with details that may be communicated to a third-party application (e.g., merchant 420).

As per an example, a user may elect to share certain transaction information with merchant 420 each time a certain button is pressed on the user's powered card before presentment to merchant terminal 402 for payment. Such information may include, for example, merchant information (e.g., merchant's address), date/time information of the purchase, amount of the purchase, type of purchase made, and any other information (e.g., the customer ID associated with the customer's merchant account) that may be selected by the user via user preferences 408. Accordingly, for example, the selected information may be automatically gathered by processing facility 406, populated within a third-party message and communicated to merchant 420 via third-party network 422 (e.g., the internet).

Upon receipt of the third-party message, merchant 420 may initiate a second transaction (e.g., a piggyback transaction or statement credit transaction). The second transaction may be communicated to processing facility 406 via third-party network (e.g., the internet) and processed by processing facility 406 accordingly. Financial details associated with the second transaction may be processed by financial processor 428, which may be operating within processing facility 406 or may be remote to processing facility 406.

Accounting GUI 432 and financial processor 428 may, for example, combine to provide an accounting programming language (APL) interface that may be used to develop a financial management system. Such a financial management system may process financial transactions received by processing facility 406 (e.g., payment transactions communicated by payment network 404 and third-party network 422) and may provide the proper accounting mechanisms that affect the various accounts (e.g., revenue and expense accounts) and account types (e.g., debit and credit account types).

Figure 5:
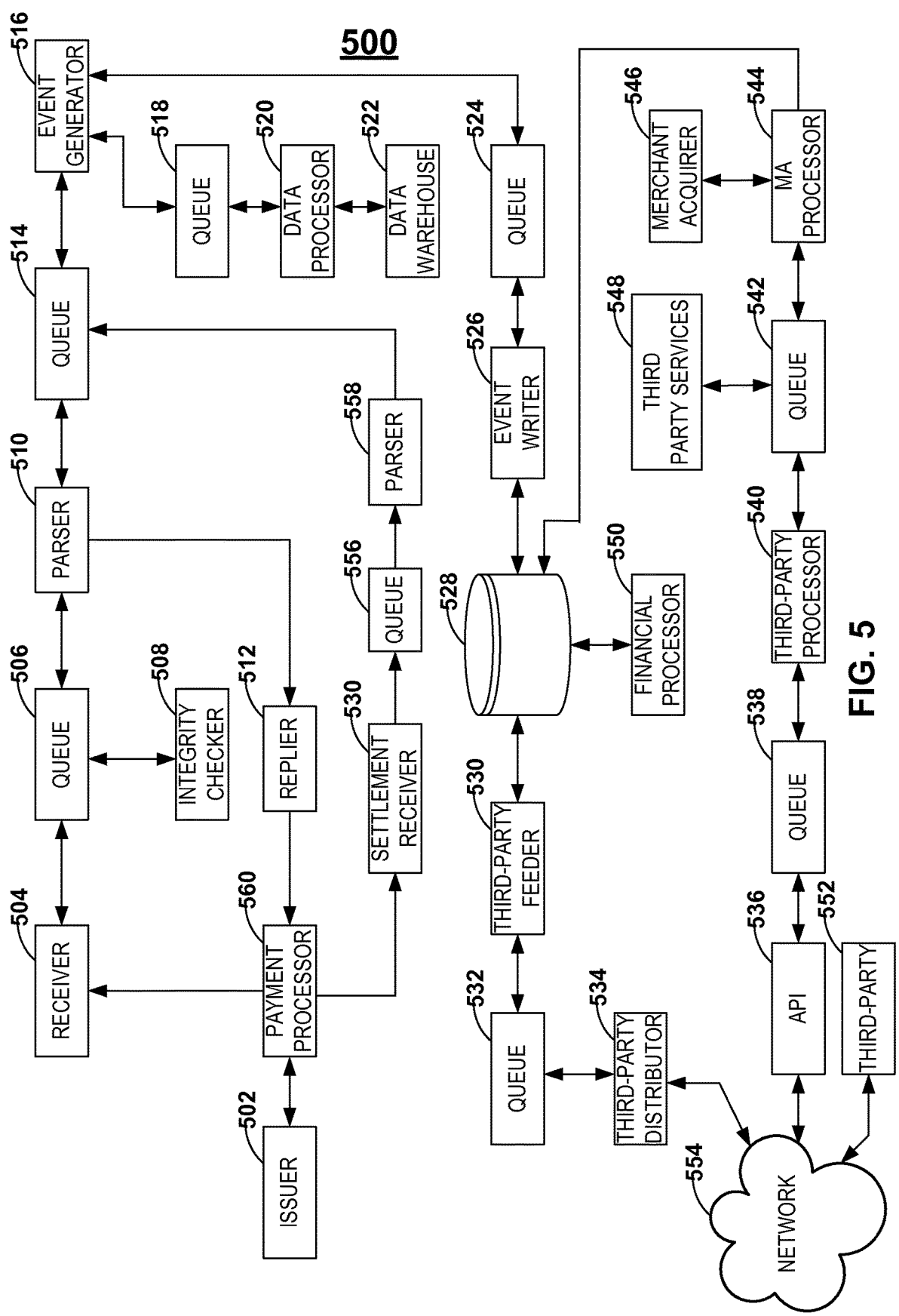
FIG. 5 is an illustration of a network constructed in accordance with the principles of the present invention.

FIG. 5 shows network 500. Purchase transactions may be processed for a merchant by a merchant acquirer (not shown) where a payment message based on the purchase transaction may be forwarded by the merchant acquirer to an issuer (e.g., issuer 502) and/or an issuer's payment processor (e.g., payment processor 560) via a payment network (e.g., VISA or MasterCard).

Receiver 504 may receive an advice message from payment processor 560 that may contain certain details about a purchase transaction (e.g., merchant type, merchant location, time of day, amount spent) and may further contain magnetic stripe information (e.g., Track 1 and Track 2 data). Alternatively, magnetic stripe information provided by the advice message may contain only a subset of Track 1 and Track 2 data (e.g., only the discretionary data fields of Track 1 and/or Track 2).

Replier 512 may provide status updates to payment processor 560 to, for example, relay to payment processor 560 that receiver 504 is operational during periods of non-activity (e.g., during a period where a lack of purchase transactions are being processed by a payment processor 560). Receiver 504 may, for example, receive the advice message via a network connection (e.g., a socket connection via SSL or TLS) from payment processor 560. Receiver 504 may, for example, comprise two or more receivers which may receive advice messages from two or more socket connections (e.g., via two or more payment processors 560).

Advice messages received by receiver 504 may be written to queue 506 (e.g., a transactional queue). Accordingly, receiver 504 may receive many advice messages and each advice message may be properly queued for processing within queue 506 without danger of being lost or destroyed. Alternatively, for example, queue 506 may be comprised of multiple queues (e.g., three non-transactional queues). The non-transactional queues may include a primary queue, a backup queue and a completed queue. Accordingly, advice messages may be written by receiver 504 to both the primary and backup queues for redundancy, while the completed queue may be reserved for tracking completion status of advice message processing. Once an advice message is processed (e.g., by parser 510), it may be written to the completed queue. Once written, both the completed advice message and its counterparts in both the primary and backup queues may be erased (e.g., by integrity checker 508) to free space in the queues for processing of subsequent advice messages.

A time-out period may exist within the primary and/or redundant queues, such that if a period of time expires (e.g., 1-2 minutes) before advice message processing completes, then integrity checker 508 may rewrite the uncompleted advice message from the backup queue back into the primary queue. In so doing, the possibility of ignoring an advice message may be minimized (e.g., decreased to zero).

Parser 510 may, for example, include one or more parsers that may pull advice messages from queue 506. Additional instances of parser 510 may, for example, be created so as to provide enough processing power to handle all advice messages received. Advice messages may be pulled from a single queue (e.g., the primary queue of queue 506), such that each parser 510 may request an advice message from queue 506 and queue 506 may provide the next available advice message to the requesting parser 510. Parsers 510 process each advice message by parsing individual data components from the advice message into an internal object that may be more easily manipulated. Parsers 510 may, for example, remove sensitive information from each advice message (e.g., payment account number and payment account holder's name) and may replace the sensitive advice message with unique user identifiers. Parsed and sanitized advice messages may be written to queue 514 (e.g., a 3-stage, non-transactional queue structure) which may be processed by event generator 516. Parsed and sanitized advice messages may be written from event generator 516 into queue 518 (e.g., a 3-stage, non-transactional queue structure) and processed by data processor 520 for long-term storage within data warehouse 522.

Once an advice message is fully parsed, the advice message may be written into the completed queue of queue 506 and a parsed advice message (or a variation of a parsed advice message) may be written to replier 512 as a reply message (e.g., an advice reply message). The advice reply message may then be communicated to payment processor 560 to confirm that advice message parsing is complete (e.g., enough of the original advice message may be repeated within the advice reply message to insure to payment processor 560 that the advice message has been properly processed).

Integrity checker 508 may detect that parsing and sanitizing of an advice message is completed by inspecting the contents of the completed queue of queue 506 against the contents of the primary queue of queue 506. When a match exists, integrity checker 508 may delete the advice message from both the primary queue and the completed queue of queue 506.

Parsed and sanitized advice messages (e.g., trevents generated by event generator 516) may be stored within database 528 via queue 524 (e.g., a 3-stage, non-transactional queue structure) by event writer 526. Each trevent stored within database 528 may, for example, be directed to a third-party application (e.g., a social network application, a coupon application, a gaming application, and/or a merchant). Third-party feeder 530 may search database 528 for trevents that have yet to be communicated to a third-party application. Once found, third-party trevents may be queued within queue 532 (e.g., a 3-stage, non-transactional queue structure) and distributed to third-party applications via third-party distributor 534. Trevents may be provided to third-party application(s) (e.g., third-party 552) via a number of communication mechanisms (e.g., via a socket port, a web service, or a web address) of network 554 (e.g., the internet).

The third-party application(s) may then acknowledge receipt of the trevents via API 536. API 536 may, for example, comprise web servers. Alternatively, API 536 may comprise a web address that may communicate data via "post" operations and "get" operations.

Third-party applications may, for example, report the completion of processing of a particular trevent via API 536. For example, a third-party trevent may comprise checking a user in at a particular coffee shop using a payment transaction conducted by the user at the coffer shop. Accordingly, for example, a third-party application may complete processing of a trevent once the transaction and appearance of the user at the coffee shop is reported to a social network of the user's choosing (e.g., Facebook or Twitter).

Third-party applications may, for example, request financial transactions (e.g., piggybacks, statement credits, returns, partial returns, adjustments, and chargebacks) via API 536. Financial transaction requests may be queued within queue 538 (e.g., a 3-stage, non-transactional queue structure) for processing by third-party processor 540 and queued within queue 542 (e.g., a 3-stage, non-transactional queue structure) for processing by third-party services 548 and/or merchant acquirer (MA) processor 544.

As per an example, a user may indicate (e.g., via a web-based application management tool) that purchases made with the user's card or device after a particular button was pressed on that card or device may cause a message to be routed to a third-party application (e.g., UpperDeck) for additional functionality. A user may, for example, indicate (e.g., via a web-based application management tool) that additional payment functionality may, for example, cause the third-party application to request that a separate transaction (e.g., a piggyback transaction) be conducted. Accordingly, for example, upon the initial payment transaction request by a user at a merchant's point-of-sale terminal, a message may be communicated to a third-party application and a piggyback transaction may be automatically requested by the third-party application based upon the user's preferences (e.g., as may be preselected via a web-based application management tool).

Such a piggyback transaction may include a second purchase transaction, where the third-party may sell goods to the user for value based upon the occurrence of the first purchase transaction. Accordingly, for example, the third party may request (e.g., via the piggyback transaction) that the user's card be charged an additional amount equal to the second purchase transaction amount.

Settlement files may, for example, be received regularly (e.g., nightly) by settlement receiver 530 from a network entity (e.g., payment processor 560). Such settlement files may, for example, result from financial transactions conducted during a time period (e.g., during a daytime period) and such financial transactions may include one or more of piggybacks, statement credits, returns, partial returns, adjustments, and chargebacks or any other transaction type. Such settlement files may, for example, be compared against authorization messages or their sanitized equivalent messages (e.g., trevent messages stored within database 528) to reconcile each authorization message received from a network entity (e.g., payment processor 560) with a corresponding settlement message.

Figure 6:
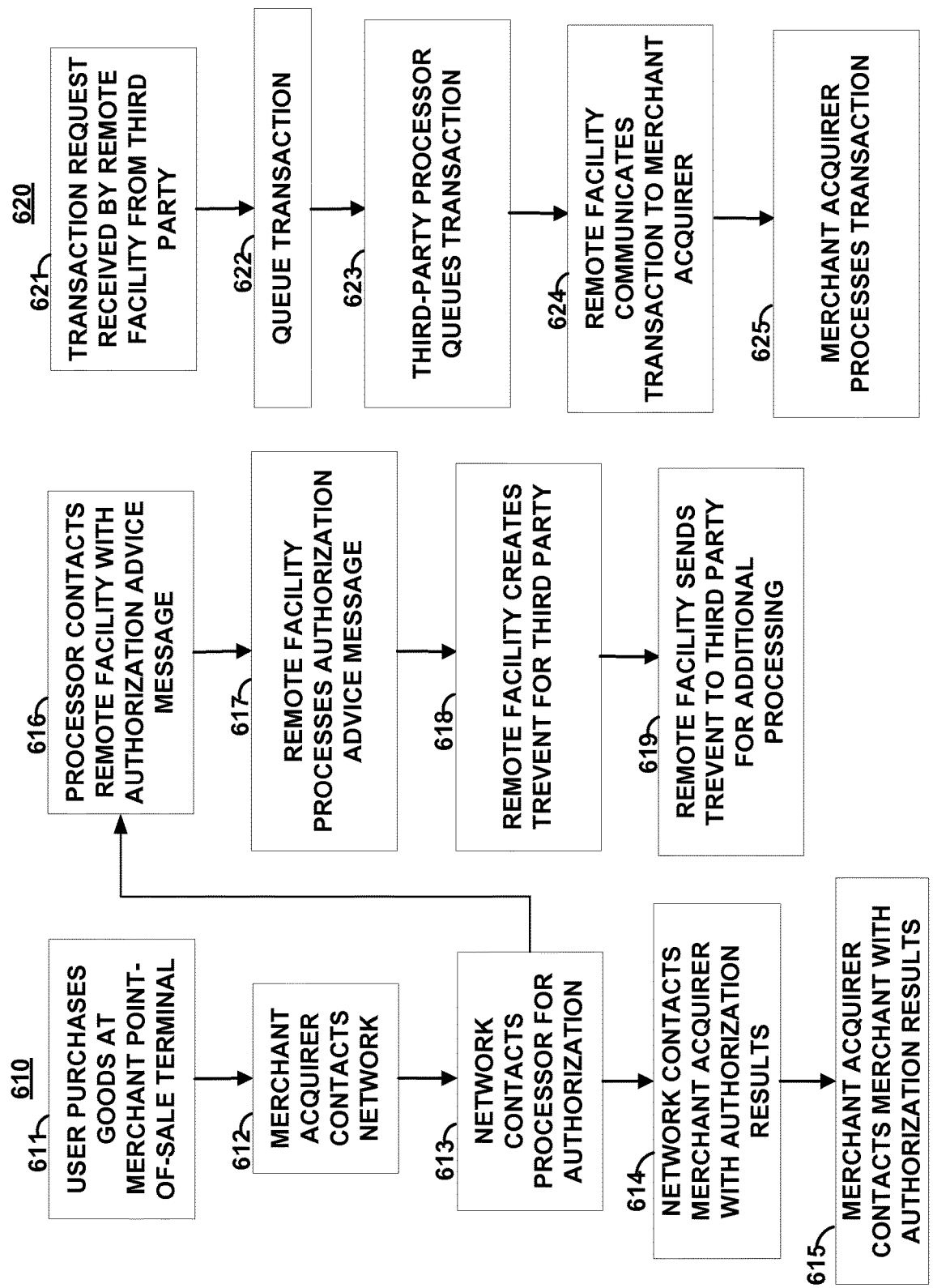
FIG. 6 is an illustration of process flow sequences in accordance with the principles of the present invention.

FIG. 6 shows a flow diagram of a process sequence. Sequence 610 may, for example, include a sequence of steps to conduct a purchase transaction. In step 611, a user may purchase goods at a merchant's point-of-sale (POS) terminal by communicating a payment message (e.g., a magnetic stripe message) to the merchant's POS terminal using the user's card or device. The merchant's POS terminal may communicate the payment message to a network entity (e.g., a merchant acquirer). In step 612, the merchant acquirer may communicate a payment network (e.g., VISA or MasterCard). The payment network may contact another network entity (e.g., a payment processor and/or issuer) to obtain an initial authorization (e.g., as in step 613) for the purchase transaction. The payment network may contact the merchant acquirer with the purchase authorization results (e.g., whether the purchase transaction was authorized or declined as in step 614). The merchant acquirer may provide the authorization results of the purchase transaction to the merchant (e.g., as in step 615).

If the purchase transaction was initiated with a card or device that was previously selected by the user to invoke additional payment functionality (e.g., via a web-based application management tool), then in step 616, a network entity (e.g., the payment processor that authorized the purchase transaction in step 613) may communicate an authorization advice message (e.g., communicated only if the purchase transaction was authorized) to a remote facility.

The authorization advice message may provide details of the purchase transaction, such as personal account number, cardholder name, merchant ID, purchase amount, Track 1 data, Track 2 data, and purchase date/time. The remote facility may sanitize the advice message (e.g., as in step 617) by replacing sensitive information (e.g., personal account number and cardholder name) with a unique cardholder identifier (e.g., a cardholder identifier that is also unique to a particular third party) to create a message (e.g., as in step 618 that contains a trevent ID that is uniquely associated to the purchase transaction authorized in step 613) that may be communicated to that third party (e.g., as in step 619).

In step 621 of sequence 620, a transaction request (e.g., a transaction request having the same trevent ID as the trevent received by the third party in step 619) may be provided by a third party and received by a remote facility (e.g., via an application programming interface provided to third-party applications by the remote facility). Persons skilled in the art will appreciate that third-party applications need not be executed remotely from the remote facility, but rather may be hosted within the remote facility itself. Persons skilled in the art will further appreciate that transactions of step 621 may include other transaction types, such as settlement transactions, piggyback transactions, statement credits, returns, partial returns, adjustments, chargebacks, or any other type of transaction.

The transaction request may be queued within the remote facility for processing (e.g., as in step 622). A third-party processor within the remote facility may receive the transaction request and may direct the request to an appropriate processor (e.g., to a merchant acquirer processor via a queue as in step 623) within the remote facility. The merchant acquirer processor may retrieve the transaction request from the queue, recognize that the transaction is a piggyback transaction, and may generate a piggyback message to be communicated to a merchant acquirer for processing (e.g., as in step 624). Accordingly, for example, the remote facility may act as if it is a merchant, since the piggyback message may be formed with payment information (e.g., a personal account number that may belong to the user who purchased goods in step 611) and may be processed by a network entity (e.g., a merchant acquirer assigned to the remote facility). In so doing, the merchant acquirer may process the transaction (e.g., as in step 625) for the remote facility by charging the user of step 611 for the piggyback charges initiated in step 621.

A temporary database within the remote facility may, for example, contain third-party transactions (e.g., all completed piggyback transactions requested by third parties) that may need additional processing. For example, each third-party requested piggyback transaction may incur fees that may need to be distributed to network entities (e.g., merchant acquirers and issuers). In addition, the remote facility may retain a certain portion of such fees earned through facilitation of the third-party transactions. Accordingly, for example, a financial management system may be provided to allow programming of such functionality via an accounting programming language (APL) interface.

Figure 7:
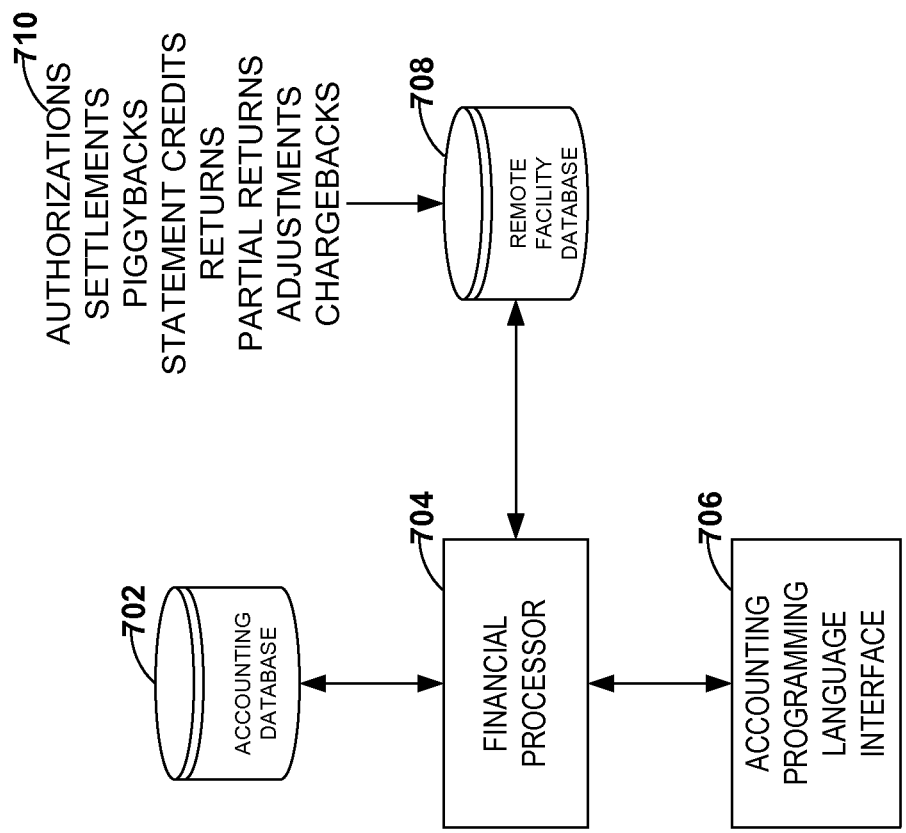
FIG. 7 is an illustration of a financial management system in accordance with the principles of the present invention.

FIG. 7 shows financial management system 700, which may include remote facility database 708, financial processor 704, accounting database 702, and accounting programming language (APL) interface 706. Remote facility database 708 may receive transactions (e.g., third-party trevents 710) from a remote facility that may necessitate various accounting processing steps to be executed, such that proper accounting procedures may be executed to account for each trevent. Persons skilled in the art will appreciate that financial management system 700 may be local to the remote facility or may be operated remotely from the remote facility.

For each trevent 710, one or more accounting procedures may be implemented by financial processor 704. Each accounting procedure may be defined (e.g., defined via a graphical user interface of APL interface 706). Accordingly, an accounting professional may interact with APL interface 706 to define each accounting procedure by programming values of accounting variables associated with each entity that may be involved with each trevent contained within database 708.

For example, third parties associated with each trevent may expect to receive compensation (e.g., a percentage of each piggyback transaction processed by the remote facility) and may expect to accrue expenses associated with such transactions (e.g., a percentage of the transaction amount paid to the remote facility). As per another example, issuers of cards or devices used by users to invoke additional payment functionality may expect to accrue expenses (e.g., a percentage of each transaction paid to the remote facility). Other network entities (e.g., a merchant acquirer associated with the remote facility) may expect to receive compensation (e.g., a flat rate and a percentage of each transaction) that may be paid to the merchant acquirer by the remote facility.

For each trevent received within database 708, financial processor 704 may retrieve the trevent for processing. In accordance with accounting rules specified (e.g., by an accounting professional via APL interface 706), financial processor 704 may perform processing steps on each trevent to generate proper entries to accounts (e.g., revenue and expense accounts) and may store those entries within accounting database 702. Each entry within database 702 may be settled after a period of time has transpired. For example, fees associated with each entry may be settled in multiple parts (e.g., two parts) where a percentage of a value of an account may be settled after a period of time (e.g., 45 days from initiation of the trevent) and the remainder of the value of the account may be settled after a period of time (e.g., 90 days from initiation of the trevent).

Figure 8:
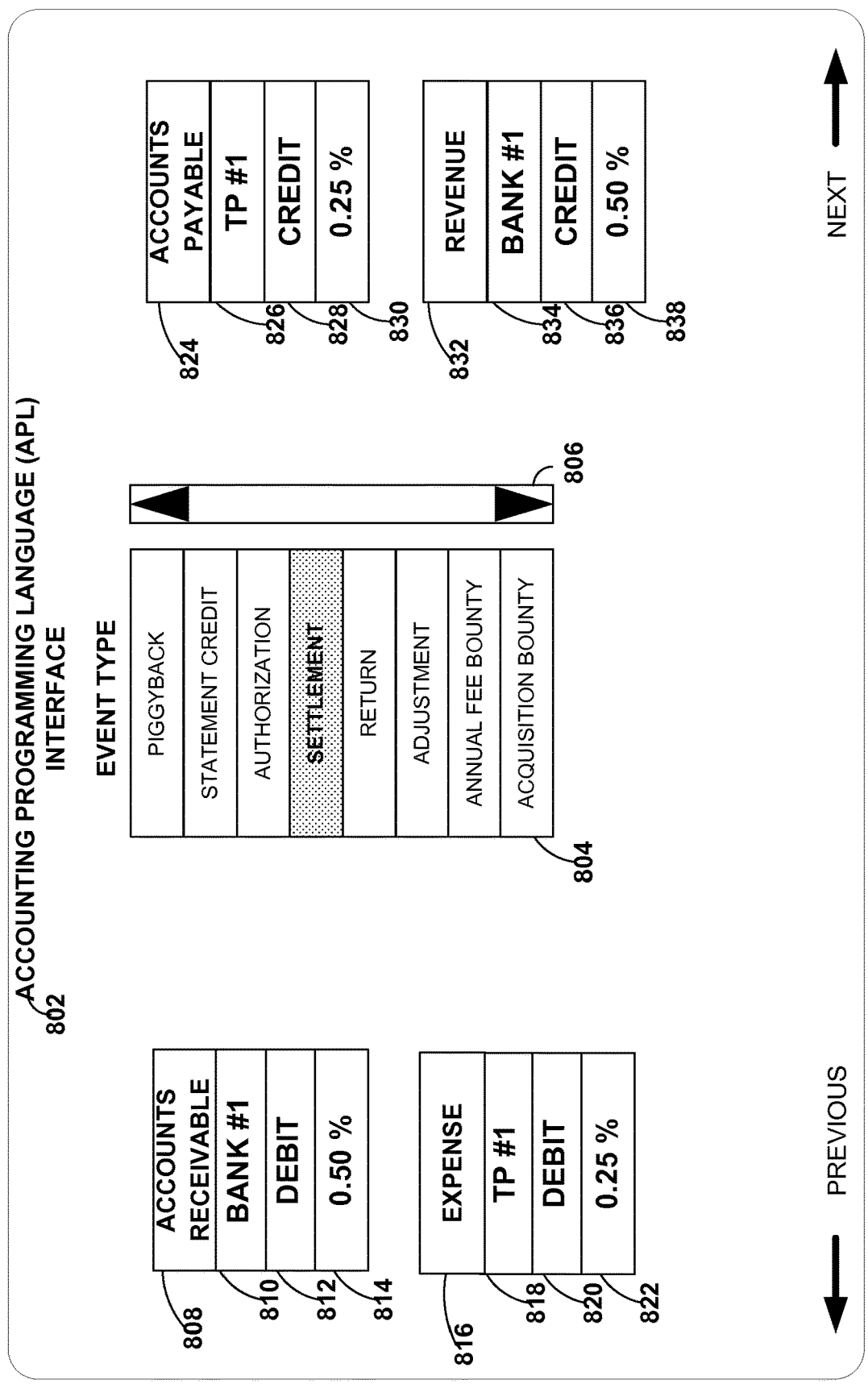
FIG. 8 is an illustration of an accounting programming interface in accordance with the principles of the present invention.

FIG. 8 shows graphical user interface (GUI) 800. GUI 800 may be executed on any architecture (e.g., a mobile telephonic device, a laptop computer, a desktop computer, or an electronic tablet) that may support display of GUI 800 and interaction with GUI 800. For example, a pointing device (e.g., a mouse or touch-sensitive display) and/or a text entry device (e.g., a keyboard) may be used by a user of GUI 800 to facilitate interaction with GUI components (e.g., activation and/or input into textual input boxes 808-838, operation of slide bar 806, and activation of entries within pull-down menu 804). A financial processor (not shown) may receive selections made by a user on GUI 800 and may use such selections as computation values of accounting variables used by a financial processor (not shown). Persons skilled in the art will appreciate that GUI 800 may provide other I/O components (e.g., radio buttons and status fields) that may be accessed/updated by a processor to receive/provide information from/to GUI 800 as may be necessary.

GUI 800 may display at least a portion of elements of accounting programming language (APL) interface 802. APL interface 802 may, therefore, facilitate account management programming by a lay person who may be unfamiliar with accounting programming languages (e.g., C, ABLE or COBOL) and/or accounting procedures. Accordingly, for example, a code generation application (not shown) may access variables defined by APL interface 802 and may build executable code (e.g., machine language executable by a financial processor) with each selection made by the user of APL interface 802. In so doing, the user may select the desired function and variable values via APL interface 802 and code representative of such selections may be automatically generated and/or utilized by a financial processor to implement the user's selections. Alternatively, executable code may already exist and variable values defined within APL interface 802 may provide input to the executable code to perform the accounting calculations and functions as defined by APL interface 802.

Slide bar 806 may be used to access event types 804. An input event (e.g., a mouse-over, mouse click, or a touch of a display that is displaying GUI 800) may select a particular event type within pull-down menu 804. Account type selections 808, 816, 824 and 832 may be programmed to identify the account types that may be associated with each respective entity (e.g., bank 810/834 and third-party 818/826). Textual input boxes 810-814 may define programmable accounting parameters and/or programmable values that may be associated with the account type programmed in textual input box 808. Textual input boxes 818-822 may define programmable accounting parameters and/or programmable values that may be associated with the account type programmed in textual input box 816. Textual input boxes 826-830 may define programmable accounting parameters and/or programmable values that may be associated with the account type programmed in textual input box 824. Textual input boxes 834-838 may define programmable accounting parameters and/or programmable values that may be associated with the account type programmed in textual input box 832.

A settlement transaction may be selected from within pull-down menu 804 and entities (e.g., issuer 810/834 and third party 818/826) may be programmed to be associated with such a selection. Accordingly, for example, settlement trevents accessed from a database of a remote facility may be processed in accordance with the parameters/values programmed by APL interface 802.

Based upon retrieving a settlement trevent from a database of the remote facility and based upon the programming parameters/values of APL interface 802, for example, a financial processor (not shown) may calculate at least a portion of the settlement transaction as debit 812 of amount 814 (e.g., an amount calculated as a percentage of a transaction amount) to the remote facility's accounts receivable 808 that may be associated with issuer 810 (e.g., the issuer of the card or device used to complete a purchase transaction). Similarly, for example, a financial processor (not shown) may calculate at least a portion of the settlement transaction as credit 836 of amount 838 (e.g., an amount calculated as a percentage of a transaction amount) to the remote facility's revenue account 832 that may be associated with issuer 834 (e.g., the issuer of the card or device used to complete a purchase transaction).

In addition, for example, a financial processor (not shown) may calculate at least a portion of the settlement transaction as credit 828 of amount 830 (e.g., an amount calculated as a percentage of a transaction amount) to the remote facility's accounts payable 824 that may be associated with third party 826 (e.g., UpperDeck). Similarly, for example, a financial processor (not shown) may calculate at least a portion of the settlement transaction as debit 820 of amount 822 (e.g., an amount calculated as a percentage of a transaction amount) to the remote facility's expense account 816 that may be associated with third party 818 (e.g., UpperDeck).

At settlement, for example, calculated revenue may be recorded as a payment to the remote facility from an issuer as a percentage of approximately 0.40% to 0.60% (e.g., approximately 0.50%) of the purchase transaction. For example, a $100 purchase transaction completed by a card or device issued by an issuer may result in a payment to the remote facility by the issuer (e.g., 0.50% of a $100 transaction equaling $0.50 is paid to the remote facility by the issuer) as may be recorded by the financial processor (not shown).

Similarly, calculated expenses may be recorded as a payment to a third party from the remote facility as a percentage of approximately 0.20% to 0.30% (e.g., approximately 0.25%) of the purchase transaction. For example, a $100 purchase transaction completed by a card or device may result in a payment to a third party by the remote facility (e.g., 0.25% of a $100 transaction equaling $0.25 is paid to third party 818 by the remote facility) as may be recorded by the financial processor (not shown).

A financial processor (not shown) may calculate and record an expense that may be paid by the remote facility to a third party in a single payment. Alternatively, a financial processor (not shown) may calculate and record an expense that may be paid by the remote facility to a third party in multiple payments (e.g., as a two-part payment). One payment may, for example, be paid by the remote facility as a percentage of an expense (e.g., 95% of the expense) to the third party within a time period (e.g., within 45 days from the purchase transaction). Another payment may, for example, be paid by the remote facility as a percentage of an expense (e.g., 5% of the expense) to the third party within another time period (e.g., within 90 days from the purchase transaction).

Persons skilled in the art will appreciate that certain fields within APL interface 802 may be programmable by a user and other fields (e.g., fields related to programmable fields) may not be programmable by the user, but rather may be status update fields that may be updated by a financial processor (not shown). Persons skilled in the art will appreciate that certain fields (e.g., textual input boxes) may instead by implemented as, for example, pull-down menus with scroll bars as may be necessary for a given application.

Figure 9:
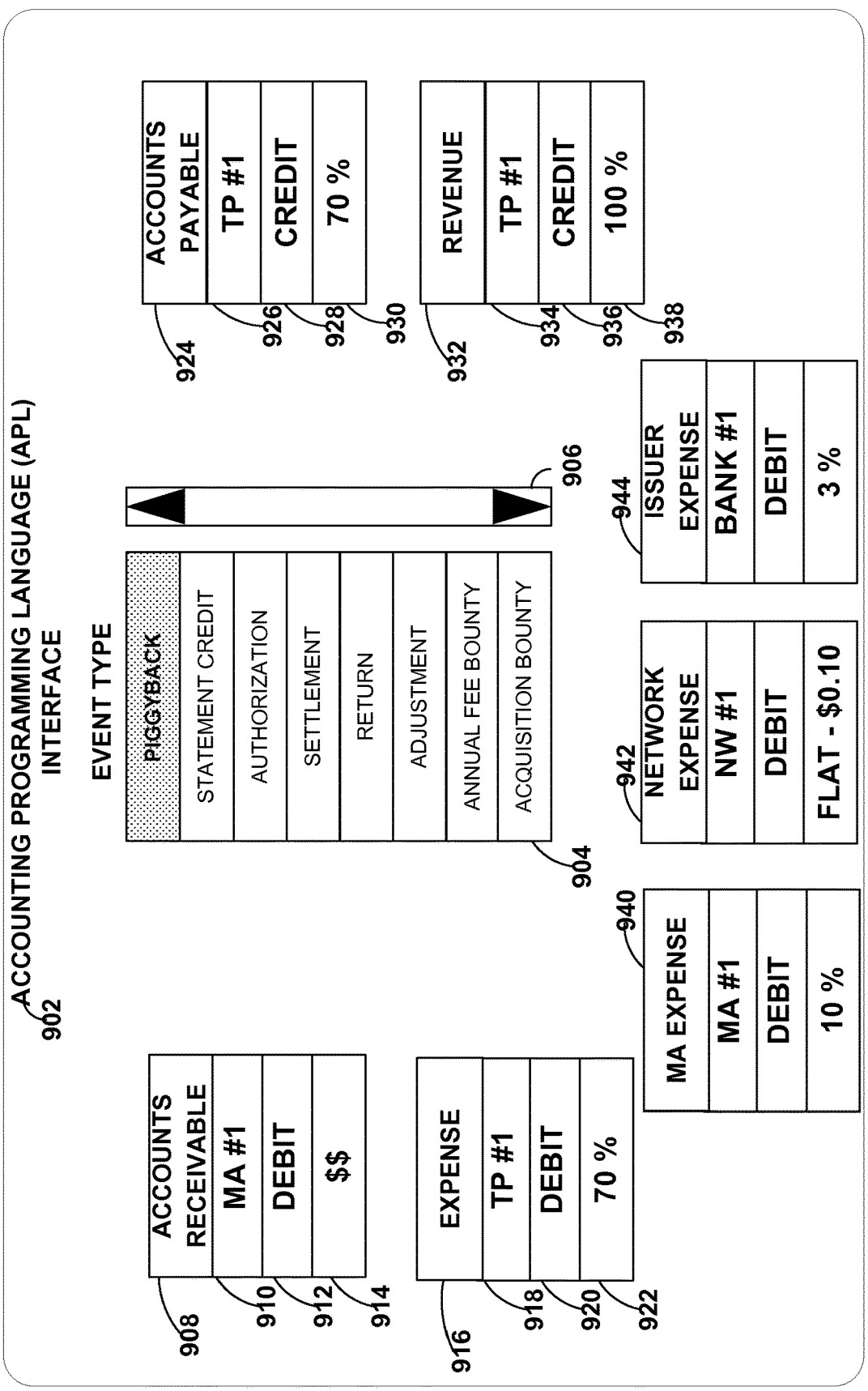
FIG. 9 is an illustration of an accounting programming interface in accordance with the principles of the present invention.

FIG. 9 shows graphical user interface (GUI) 900. GUI 900 may display at least a portion of elements of accounting programming language (APL) interface 902. APL interface 902 may, therefore, facilitate account management programming by a lay person who may be unfamiliar with accounting programming languages (e.g., C, ABLE or COBOL) and/or accounting procedures. Accordingly, for example, a code generation application (not shown) may access variables defined by APL interface 902 and may build executable code (e.g., machine language executable by a financial processor) with each selection made by the user of APL interface 902. In so doing, the user may select the desired function and variable values via APL interface 902 and code representative of such selections may be automatically generated and/or utilized by a financial processor to implement the user's selections. Alternatively, executable code may already exist and variable values defined within APL interface 902 may provide input to the executable code to perform the accounting calculations and functions as defined by APL interface 902.

Slide bar 906 may be used to access event types 904. An input event (e.g., a mouse-over, mouse click, or a touch of a display that is displaying GUI 900) may select a particular event type within pull-down menu 904. Account type selections 908, 916, 924 and 932 may be programmed to identify the account types that may be associated with each respective entity (e.g., merchant acquirer 910 and third-party 918/926/934). Account status areas 940, 942 and 944 may or may not be programmed to identify expense accounts that may be associated with fees charged by other entities (e.g., a merchant acquirer, a payment network such as VISA or MasterCard, and an issuing bank). For example, account status areas 940-944 may represent fees incurred by a merchant acquirer and associated entities, where the amount of such expenses may or may not be programmable via APL interface 902.

Textual input boxes 910-914 may define programmable accounting parameters and/or programmable values that may be associated with the account type programmed in textual input box 908. Textual input boxes 918-922 may define programmable accounting parameters and/or programmable values that may be associated with the account type programmed in textual input box 916. Textual input boxes 926-930 may define programmable accounting parameters and/or programmable values that may be associated with the account type programmed in textual input box 924. Textual input boxes 934-938 may define programmable accounting parameters and/or programmable values that may be associated with the account type programmed in textual input box 932.

A piggyback transaction may be selected from within pull-down menu 904 and entities (e.g., merchant acquirer 910 and third-party 918/926/934) may be programmed to be associated with such a selection. Accordingly, for example, piggyback trevents accessed from a database of a remote facility may be processed in accordance with the parameters/values programmed by APL interface 902.

Based upon retrieving a piggyback trevent from a database of the remote facility and based upon the programming parameters/values of APL interface 902, for example, a financial processor (not shown) may calculate at least a portion of the piggyback transaction as debit 912 of amount 914 (e.g., a piggyback transaction amount minus fees associated with the piggyback transaction) to the remote facility's accounts receivable 908 that may be associated with merchant acquirer 910 (e.g., the merchant acquirer of the remote facility that is requesting a piggyback transaction). In so doing, for example, the remote facility may be acting as a merchant. Accordingly, for example, the remote facility may require a merchant acquirer to process the piggyback transaction, where expenses associated with the piggyback transaction may include: a percentage fee (e.g., 10% of the piggyback transaction amount) charged by the merchant acquirer as displayed in account status area 940; a flat fee (e.g., $0.10) charged by the network (e.g., VISA) as displayed in account status area 942; and a percentage fee (e.g., 3% of the piggyback transaction amount) charged by the issuing bank as displayed in account status area 944. Similarly, for example, a financial processor (not shown) may calculate at least a portion of the piggyback transaction as credit 936 of amount 938 (e.g., 100% of the piggyback transaction) to the remote facility's revenue account 932 that may be associated with third party 934 (e.g., UpperDeck).

In addition, for example, a financial processor (not shown) may calculate at least a portion of the piggyback transaction as credit 928 of amount 930 (e.g., a percentage of a piggyback transaction amount) to the remote facility's accounts payable 924 that may be associated with third party 926 (e.g., UpperDeck). Similarly, for example, a financial processor (not shown) may calculate at least a portion of the piggyback transaction as debit 920 of amount 922 (e.g., a percentage of a piggyback transaction amount) to the remote facility's expense account 916 that may be associated with third party 918 (e.g., UpperDeck).

A piggyback transaction may, for example, be an additional charge to a user's account that is requested by the user via the user's application manager (e.g., the user's web-based application manager) after the user initiates a purchase transaction with his or her card or device. An amount of the piggyback transaction may, for example, be transferred from the user's issuing bank to the remote facility's merchant acquirer. The merchant acquirer may deduct associated fees and may instruct the merchant acquirer's bank to pay the remote facility the remaining portion. For example, a $2 piggyback transaction may result in a payment to the remote facility by the merchant acquirer's bank in an amount equal to the piggyback transaction amount (e.g., $2.00) minus the amount of the merchant acquirer's fees (e.g., a 10% merchant acquirer fee of $0.20, a flat $0.10 issuer fee, and a 3% issuer fee of $0.06) for a total amount paid to the remote facility of $1.64 as may be indicated by amount 914.

Similarly, expenses may be recorded as a payment to third party 918 from the remote facility as a percentage of approximately 60% to 80% (e.g., approximately 70%) of the piggyback transaction amount. For example, a $2 piggyback transaction amount may result in a payment to third party 918 by the remote facility (e.g., 70% of a $2 transaction equaling $1.40 is paid to third party 918 by the remote facility) as may be recorded by the financial processor (not shown).

A financial processor (not shown) may calculate and record an expense that may be paid by the remote facility to a third party in a single payment. Alternatively, a financial processor (not shown) may calculate and record an expense that may be paid by the remote facility to a third party in multiple payments (e.g., as a two-part payment). One payment may, for example, be paid by the remote facility as a percentage of an expense (e.g., 95% of the expense) to the third party within a time period (e.g., within 45 days from the purchase transaction). Another payment may, for example, be paid by the remote facility as a percentage of an expense (e.g., 5% of the expense) to the third party within another time period (e.g., within 90 days from the purchase transaction).

Persons skilled in the art will appreciate that certain fields within APL interface 902 may be programmable by a user and other fields (e.g., fields related to programmable fields) may not be programmable by the user, but rather may be status update fields that may be updated by a financial processor (not shown). Persons skilled in the art will appreciate that certain fields (e.g., textual input boxes) may instead by implemented as, for example, pull-down menus with scroll bars as may be necessary for a given application.

A piggyback transaction may result in another transaction (e.g., a settlement transaction) and may be processed by a remote facility as a settlement transaction. Accordingly, for example, the remote facility may additionally earn a percentage of the piggyback transaction (e.g., 0.5% of the piggyback transaction amount) upon processing of the piggyback transaction as a subsequent settlement transaction.

Figure 10:
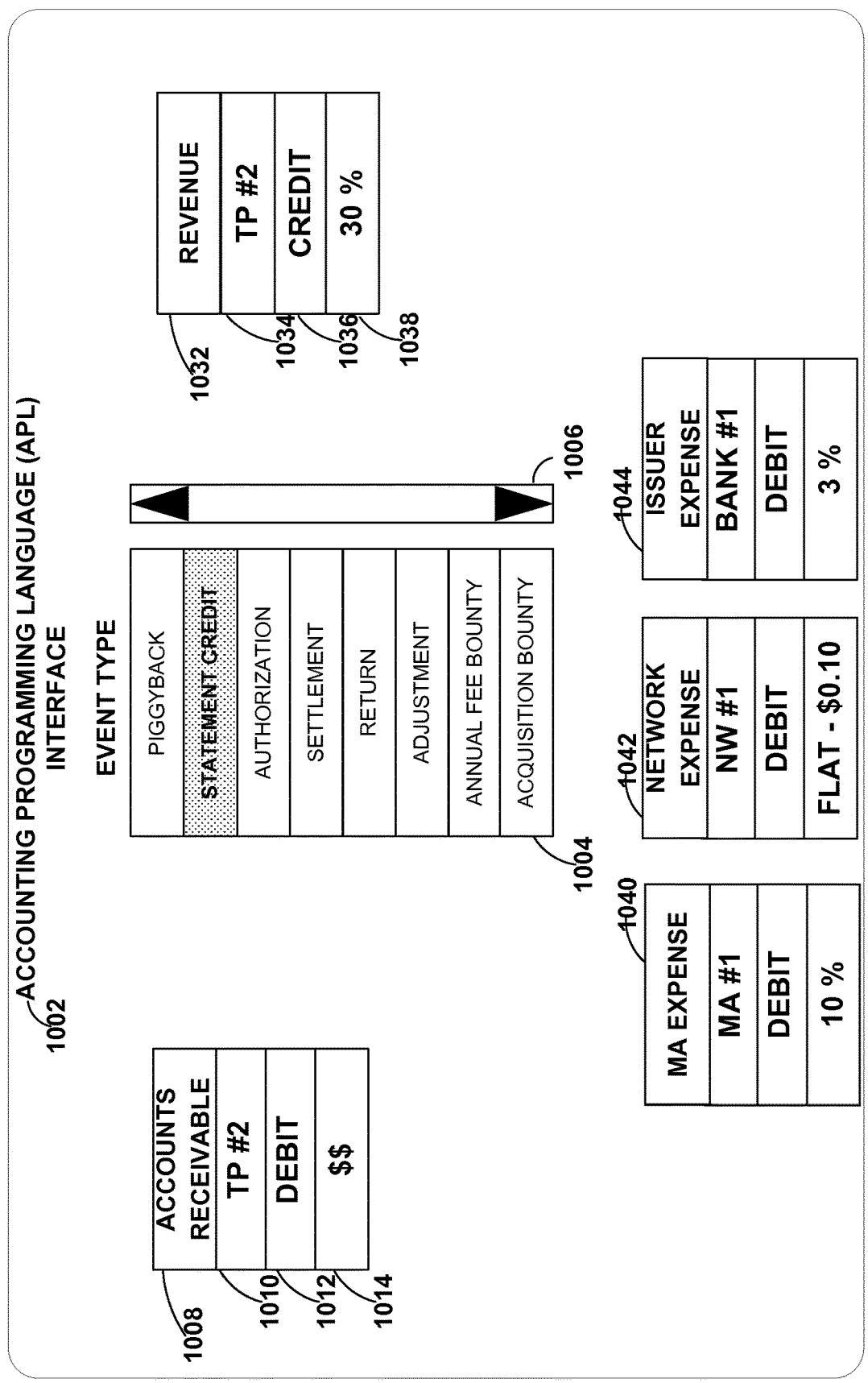
FIG. 10 is an illustration of an accounting programming interface in accordance with the principles of the present invention.

FIG. 10 shows graphical user interface (GUI) 1000. GUI 1000 may display at least a portion of elements of accounting programming language (APL) interface 1002. APL interface 1002 may, therefore, facilitate account management programming by a lay person who may be unfamiliar with accounting programming languages (e.g., C, ABLE or COBOL) and/or accounting procedures. Accordingly, for example, a code generation application (not shown) may access variables defined by APL interface 1002 and may build executable code (e.g., machine language executable by a financial processor) with each selection made by the user of APL interface 1002. In so doing, the user may select the desired function and variable values via APL interface 1002 and code representative of such selections may be automatically generated and/or utilized by a financial processor to implement the user's selections. Alternatively, executable code may already exist and variable values defined within APL interface 1002 may provide input to the executable code to perform the accounting calculations and functions as defined by APL interface 1002.

Slide bar 1006 may be used to access event types 1004. An input event (e.g., a mouse-over, mouse click, or a touch of a display that is displaying GUI 1000) may select a particular event type within pull-down menu 1004. Account type selections 1008 and 1032 may be programmed to identify the account types that may be associated with each respective entity (e.g., third-party 1010/1034). Account status areas 1040, 1042 and 1044 may or may not be programmed to identify expense accounts that may be associated with fees charged by other entities (e.g., a merchant acquirer, a payment network such as VISA or MasterCard, and an issuing bank). For example, account status areas 1040-1044 may represent fees incurred by a remote facility's merchant acquirer and associated entities, where the amount of such expenses may or may not be programmable via APL interface 1002.

Textual input boxes 1010-1014 may define programmable accounting parameters and/or programmable values that may be associated with the account type programmed in textual input box 1008. Textual input boxes 1034-1038 may define programmable accounting parameters and/or programmable values that may be associated with the account type programmed in textual input box 1032.

A statement credit transaction may be selected from within pull-down menu 1004 and entities (e.g., third-party 1010/1034) may be programmed to be associated with such a selection. Accordingly, for example, statement credit trevents accessed from a database of a remote facility may be processed in accordance with the parameters/values programmed by APL interface 1002.

Based upon retrieving a statement credit trevent from a database of the remote facility and based upon the programming parameters/values of APL interface 1002, for example, a financial processor (not shown) may calculate at least a portion of the statement credit transaction as debit 1012 of amount 1014 (e.g., a percentage of a statement credit transaction amount minus fees associated with the statement credit transaction) to the remote facility's accounts receivable 1008 that may be associated with third party 1010 (e.g., the third party providing the statement credit). The expenses associated with the statement credit transaction may include: a percentage fee (e.g., 10% of the statement credit transaction amount) charged by the remote facility's merchant acquirer as reflected in status area 1040; a flat fee (e.g., $0.10) charged by the network (e.g., VISA) (e.g., as reflected in status area 1042); and a percentage fee (e.g., 3% of the statement credit transaction amount) charged by the issuing bank (e.g., as reflected in status 1044). Similarly, for example, a financial processor (not shown) may calculate at least a portion of the statement credit transaction as credit 1036 of amount 1038 (e.g., 30% of the statement credit transaction) to the remote facility's revenue account 1032 that may be associated with third party 1034 (e.g., the third party providing the statement credit).

A statement credit transaction may, for example, be a credit, requested by the user, that is applied to a user's account via appropriate selections within the user's application manager after the user initiates a purchase transaction with the selected third party. A purchase transaction with a third party providing the statement credit may qualify for the statement credit if the transaction amount is an amount that qualifies for the statement credit. For example, a third party (e.g., Giant Eagle) may provide a statement credit (e.g., a statement credit for $50 worth of gas) if the user first spends a minimum amount (e.g., $100) at Giant Eagle.

Once the initial purchase amount (e.g., $100 purchase at Giant Eagle) and the subsequent purchase of the credit amount (e.g., $50 worth of gas at GetGo) have been settled, an amount (e.g., a percentage of the statement credit transaction) may, for example, be transferred from the third party that is providing the statement credit (e.g., Giant Eagle) to the remote facility's merchant acquirer. The merchant acquirer may deduct associated fees and may instruct the merchant acquirer's bank to pay the remote facility the remaining portion. For example, a $50 statement credit transaction may result in a payment to the remote facility by the merchant acquirer's bank in an amount equal to a percentage approximately between 20% and 40% (e.g., approximately equal to 30%) of the statement credit transaction amount minus the amount of the merchant acquirer's fees (e.g., a 10% merchant acquirer fee of $5, a flat $0.10 issuer fee, and a 3% issuer fee of $1.50) for a total amount paid to the remote facility of $8.40 as may be indicated by amount 1014.

Persons skilled in the art will appreciate that certain fields within APL interface 1002 may be programmable by a user and other fields (e.g., fields related to programmable fields) may not be programmable by the user, but rather may be status update fields that may be updated by a financial processor (not shown). Persons skilled in the art will appreciate that certain fields (e.g., textual input boxes) may instead by implemented as, for example, pull-down menus with scroll bars as may be necessary for a given application.

Other accounting transactions may be accounted for by a financial management system. For example, an annual fee bounty transaction may be processed to generate annual fee revenue to a remote facility as may be paid by the issuing bank. As per another example, an acquisition bounty transaction may be processed to generate revenue to a remote facility if a user makes at least one purchase within a time period (e.g., a remote facility may earn a $75 acquisition fee if a user makes a purchase with a card or device within 120 days of activation). An acquisition bounty transaction may generate reduced revenue if a user makes at least one purchase within another time period (e.g., a remote facility may earn a $50 acquisition fee if a user makes a purchase with a card or device between 120-240 days of activation).

Figure 11:
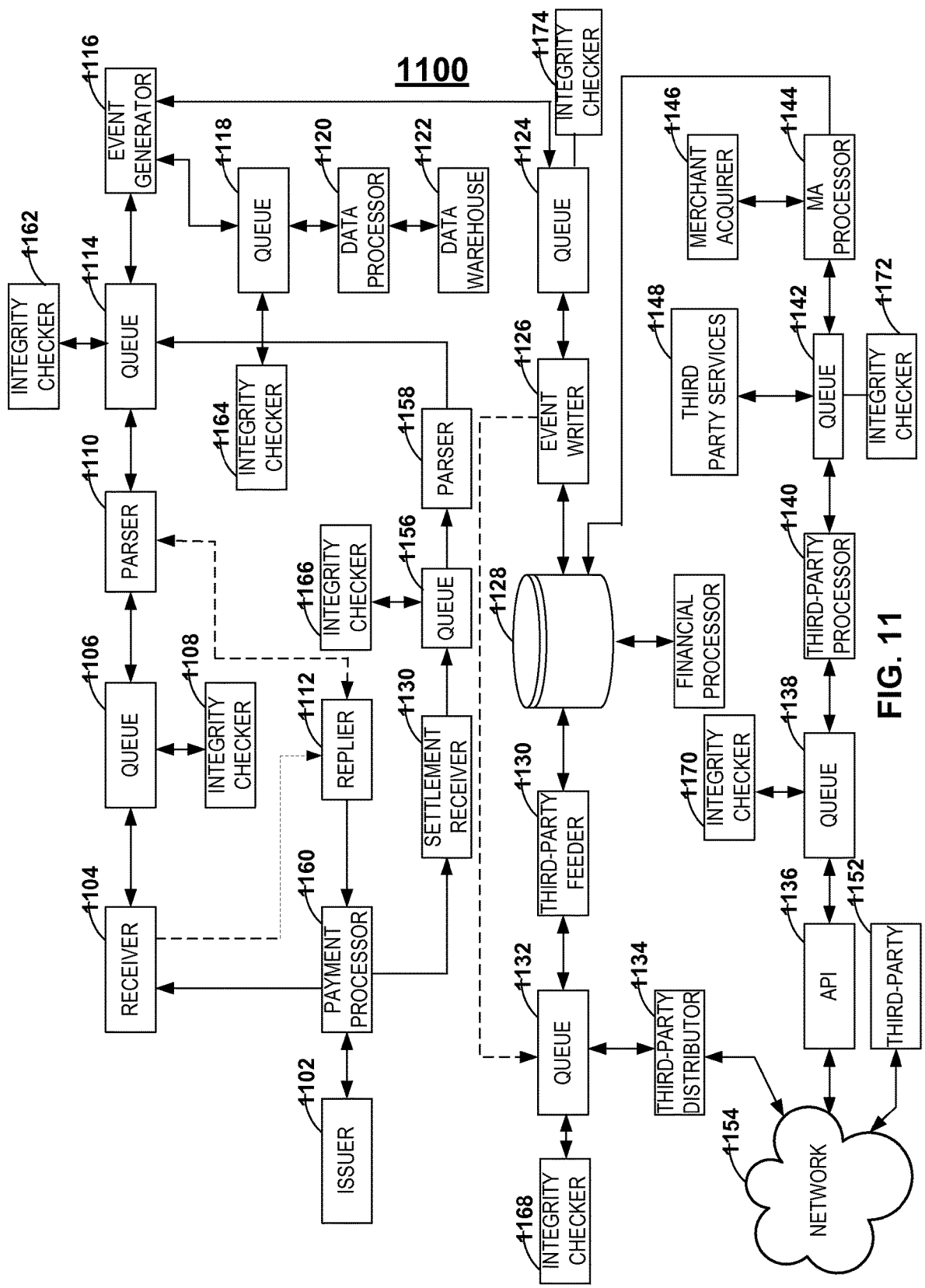
FIG. 11 is an illustration of a network constructed in accordance with the principles of the present invention.

FIG. 11 shows network 1100. Purchase transactions may be processed for a merchant by a merchant acquirer (not shown) where a payment message based on the purchase transaction may be forwarded by the merchant acquirer to an issuer (e.g., issuer 1102) and/or an issuer's payment processor (e.g., payment processor 1160) via a payment network (e.g., VISA or MasterCard).

Receiver 1104 may receive an advice message from payment processor 1160 that may contain certain details about a purchase transaction (e.g., merchant type, merchant location, time of day, amount spent) and may further contain magnetic stripe information (e.g., Track 1 and Track 2 data). Alternatively, magnetic stripe information provided by the advice message may contain only a subset of Track 1 and Track 2 data (e.g., only the discretionary data fields of Track 1 and/or Track 2).

Replier 1112 may provide status updates to payment processor 1160 to, for example, relay to payment processor 1160 that receiver 1104 is operational during periods of non-activity (e.g., during a period where a lack of purchase transactions are being processed by payment processor 1160). Receiver 1104 may, for example, receive the advice message via a network connection (e.g., a socket connection via SSL or TLS) from payment processor 1160. Receiver 1104 may, for example, comprise two or more receivers which may receive advice messages from two or more socket connections (e.g., via two or more payment processors 1160).

Advice messages received by receiver 1104 may be written to queue 1106 (e.g., a transactional queue). Accordingly, receiver 1104 may receive many advice messages and each advice message may be properly queued for processing within queue 1106 without danger of being lost or destroyed. Alternatively, for example, queue 1106 may be comprised of multiple queues (e.g., three non-transactional queues). The non-transactional queues may, for example, include a primary queue, a backup queue and a completed queue. Accordingly, advice messages may be written by receiver 1104 to both the primary and backup queues for redundancy, while the completed queue may be reserved for tracking completion status of advice message processing. Once an advice message is processed (e.g., by parser 1110), it may be written to the completed queue. Once written, both the completed advice message and its counterparts in both the primary and backup queues may be erased (e.g., by integrity checker 1108) to free space in the queues for processing of subsequent advice messages.

A time-out period may exist within the primary and/or redundant queues, such that if a period of time expires (e.g., 1-2 minutes) before advice message processing completes, then integrity checker 1108 may rewrite the uncompleted advice message from the backup queue back into the primary queue. In so doing, the possibility of ignoring an advice message may be minimized (e.g., decreased to zero).

Parser 1110 may, for example, include one or more parsers that may pull advice messages from queue 1106. Additional instances of parser 1110 may, for example, be created so as to provide enough processing power to handle all advice messages received. Advice messages may be pulled from a single queue (e.g., the primary queue of queue 1106), such that each parser 1110 may request an advice message from queue 1106 and queue 1106 may provide the next available advice message to the requesting parser 1110. Parsers 1110 may process each advice message by parsing individual data components from the advice message into internal objects that may be more easily manipulated. Parsers 1110 may, for example, remove sensitive information from each advice message (e.g., payment account number and payment account holder's name) and may replace the sensitive information with unique user identifiers. Parsed and sanitized advice messages may be written to queue 1114 (e.g., a 3-stage, non-transactional queue with integrity checker 1162) which may be processed by event generator 1116. Parsed and sanitized advice messages may be written from event generator 1116 into queue 1118 (e.g., a 3-stage, non-transactional queue with integrity checker 1164) and processed by data processor 1120 for long-term storage within data warehouse 1122.

Once an advice message is fully parsed, the advice message may be written into the completed queue of queue 1106 and a parsed advice message (or a variation of a parsed advice message) may be written to replier 1112 as a reply message (e.g., an advice reply message). The advice reply message may then be communicated to payment processor 1160 to confirm that advice message parsing is complete (e.g., enough of the original advice message may be repeated within the advice reply message to insure to payment processor 1160 that the advice message has been properly processed).

Alternately, for example, receiver 1104 may itself parse individual data components from the advice message prior to writing the parsed message to primary and backup queues 1106. Additionally, for example, receiver 1104 may provide the parsed message to replier 1112. In so doing, parser 1110 may not be required to communicate with replier 1112 at all. Instead, the parsed message may be communicated to replier 1112 by receiver 1104 and replier 1112 may communicate the advice reply message to payment processor 1160 based on the parsed message received from receiver 1104.

Integrity checker 1108 may detect that parsing and sanitizing of an advice message is completed by inspecting the contents of the completed queue of queue 1106 against the contents of the primary queue of queue 1106. When a match exists, integrity checker 1108 may delete the advice message from both the primary queue and the completed queue of queue 1106.

Parsed and sanitized advice messages (e.g., trevents generated by event generator 1116) may be stored within database 1128 via queue 1124 (e.g., a 3-stage, non-transactional queue with integrity checker 1174) by event writer 1126. Each trevent stored within database 1128 may, for example, be directed to a third-party application (e.g., a social network application, a coupon application, a gaming application, and/or a merchant). Third-party feeder 1130 may search database 1128 for trevents that have yet to be communicated to a third-party application. Once found, third-party trevents may be queued within queue 1132 (e.g., a 3-stage, non-transactional queue with integrity checker 1168) and distributed to third-party applications via third-party distributor 1134. Event writer 1126 may, for example, write trevents directly into queue 1132 instead of, or in addition to, writing trevents into database 1128. Accordingly, for example, an optimized trevent flow may result, where third-party feeder 1130 may provide a fail-safe mechanism. Trevents may be provided to third-party application(s) (e.g., third-party 1152) via a number of communication mechanisms (e.g., via a socket port, a web service, or a web address) of network 1154 (e.g., the Internet).

The third-party application(s) may then acknowledge receipt of the trevents via API 1136. API 1136 may, for example, comprise web servers. Alternatively, API 1136 may comprise a web address that may communicate data via "post" operations and "get" operations.

Third-party applications may, for example, report the completion of processing of a particular trevent via API 1136. For example, a third-party trevent may comprise checking a user in at a particular coffee shop using a payment transaction conducted by the user at the coffee shop. Accordingly, for example, a third-party application may complete processing of a trevent once the transaction and appearance of the user at the coffee shop is reported to a social network of the user's choosing (e.g., Facebook or Twitter).

Third-party applications may, for example, request financial transactions (e.g., piggybacks, statement credits, adjustments, and chargebacks) via API 1136. Financial transaction requests may be queued within queue 1138 (e.g., a 3-stage, non-transactional queue with integrity checker 1170) for processing by third-party processor 1140 and queued within queue 1142 (e.g., a 3-stage, non-transactional queue with integrity checker 1172) for processing by third-party services 1148 and/or merchant acquirer (MA) processor 1144.

As per an example, a user may indicate (e.g., via a web-based application management tool) that purchases made with the user's card or device after a particular button was pressed on that card or device may cause a message to be routed to a third-party application (e.g., UpperDeck) for additional functionality. A user may, for example, indicate (e.g., via a web-based application management tool) that additional payment functionality may, for example, cause the third-party application to request that a separate transaction (e.g., a piggyback transaction) be conducted. Accordingly, for example, upon the initial payment transaction request by a user at a merchant's point-of-sale terminal, a message may be communicated to a third-party application and a piggyback transaction may be automatically requested by the third-party application based upon the user's preferences (e.g., as may be preselected via a web-based application management tool).

Such a piggyback transaction may include a second purchase transaction, where the third-party may sell goods to the user for value based upon the occurrence of the first purchase transaction. Accordingly, for example, the third party may request (e.g., via the piggyback transaction) that the user's card be charged an additional amount equal to the second purchase transaction amount.

Settlement files may, for example, be received regularly (e.g., nightly) by settlement receiver 1130 from a network entity (e.g., payment processor 1160). Such settlement files may, for example, result from financial transactions conducted during a time period (e.g., during a daytime period) and such financial transactions may include one or more of piggybacks, statement credits, returns, partial returns, adjustments, and chargebacks or any other transaction type. Such settlement files may, for example, be compared against authorization messages or their sanitized equivalent messages (e.g., trevent messages stored within database 1128) to reconcile each authorization message received from a network entity (e.g., payment processor 1160) with a corresponding settlement message.

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A financial management system comprising:
   a financial processor operable to retrieve a first transaction from a remote facility database, said first transaction being automatically initiated based on a second transaction; and
   an accounting programming language interface operable to define accounting operations to be performed based on said first transaction,
   wherein operation of said financial processor is based on said accounting operations.

2. The financial management system of claim 1, wherein said second transaction is a purchase transaction.

3. The financial management system of claim 1, wherein said first transaction is a piggyback transaction.

4. The financial management system of claim 1, wherein said first transaction is associated with a third party.

5. The financial management system of claim 1, wherein said first transaction is a payment transaction.

6. The financial management system of claim 1, wherein said second transaction comprises a payment message.

7. The financial management system of claim 1, further comprising a processing facility.

8. The financial management system of claim 1, further comprising:
   a processing facility,
   wherein said second transaction comprises a payment message, and
   said processing facility is operable to parse said payment message.

9. The financial management system of claim 1, wherein said second transaction comprises a payment message associated with a powered card.

10. The financial management system of claim 1, wherein said second transaction includes a payment message associated with a powered card, and
    said payment message is indicative of a button being pressed on said powered card.

11. The financial management system of claim 1, wherein said first transaction is previously associated with said second transaction.

12. The financial management system of claim 1, wherein said first transaction is previously associated with said second transaction by a web-based application management tool.

13. The financial management system of claim 1, wherein said first transaction is a financial transaction.

* * * * *